(12) United States Patent
Velayudham et al.

(10) Patent No.: US 11,326,678 B2
(45) Date of Patent: May 10, 2022

(54) FRICTION DISC APPARATUS AND RELATED TORQUE CONVERTER ASSEMBLIES FOR USE WITH VEHICLES

(71) Applicant: VALEO KAPEC CO., LTD., Daegu (KR)

(72) Inventors: Vijayakumar Velayudham, Auburn Hills, MI (US); Sungchul Lee, Auburn Hills, MI (US); Subramanian Jeyabalan, Daegu (KR); Caleb Garcia, San Luis Potosi (MX)

(73) Assignee: VALEO KAPEC CO., LTD., Daegu (KR)

( * ) Notice: Subject to any disclaimer, the term of this patent is extended or adjusted under 35 U.S.C. 154(b) by 0 days.

(21) Appl. No.: 16/903,899

(22) Filed: Jun. 17, 2020

(65) Prior Publication Data

US 2021/0396301 A1 Dec. 23, 2021

(51) Int. Cl.
*F16H 45/02* (2006.01)
*F16D 25/0635* (2006.01)

(52) U.S. Cl.
CPC ......... *F16H 45/02* (2013.01); *F16D 25/0635* (2013.01); *F16H 2045/0226* (2013.01); *F16H 2045/0294* (2013.01)

(58) Field of Classification Search
CPC .............. F16H 45/02; F16H 25/0635; F16H 2045/0294; F16H 2045/0278; F16H 2045/0284; F16H 2045/0221–0231
USPC ....................................................... 192/3.29
See application file for complete search history.

(56) References Cited

U.S. PATENT DOCUMENTS

| | | | | |
|---|---|---|---|---|
| 5,209,330 A | * | 5/1993 | Macdonald | F16H 45/02 192/212 |
| 5,622,244 A | * | 4/1997 | Hansen | F16D 35/00 192/208 |
| 6,745,563 B1 | | 6/2004 | Shue | |
| 6,938,744 B2 | * | 9/2005 | Tomiyama | F16H 45/02 192/212 |
| 6,948,602 B2 | | 9/2005 | Arhab et al. | |
| 9,010,507 B2 | | 4/2015 | Vanni et al. | |
| 9,322,463 B2 | * | 4/2016 | Medellin | F16H 45/02 |

(Continued)

FOREIGN PATENT DOCUMENTS

| | | | | |
|---|---|---|---|---|
| JP | 2002-544447 A | | 12/2002 | |
| JP | 2010242891 A | * | 10/2010 | F16H 45/02 |

(Continued)

*Primary Examiner* — David R Morris
(74) *Attorney, Agent, or Firm* — Oblon, McClelland, Maier & Neustadt, L.L.P.

(57) ABSTRACT

A torque converter assembly includes a torsional vibration damper and a clutch operatively coupled to the torsional vibration damper. The clutch includes a friction disc having a tab coupled to a distal portion of the friction disc and extending axially away from the distal portion. The clutch also includes a piston configured to urge the friction disc into engagement with a torque converter cover to transfer torque from the torque converter cover to the torsional vibration damper. The tab includes a first segment directly contacting a spring member or a spring seat of the torsional vibration damper and a second segment, between the first segment and the distal portion of the friction disc, configured to slide against a guide surface of the torsional vibration damper to provide radial guidance to the friction disc.

15 Claims, 21 Drawing Sheets

(56) References Cited

U.S. PATENT DOCUMENTS

| | | | | |
|---|---|---|---|---|
| 9,506,506 | B2 * | 11/2016 | Zaugg | F16D 33/18 |
| 9,765,848 | B2 * | 9/2017 | Wickel | F16F 15/12366 |
| 9,777,817 | B2 | 10/2017 | Strom et al. | |
| 10,352,423 | B2 * | 7/2019 | Cai | F16H 45/02 |
| 2009/0107792 | A1 * | 4/2009 | Kneidel | F16H 45/02 |
| | | | | 192/70.17 |
| 2011/0247322 | A1 * | 10/2011 | Lindemann | F16F 15/133 |
| | | | | 60/338 |
| 2013/0233665 | A1 * | 9/2013 | Vanni | F16D 33/18 |
| | | | | 192/3.28 |
| 2014/0318914 | A1 * | 10/2014 | Zaugg | F16D 3/12 |
| | | | | 192/3.28 |
| 2014/0345553 | A1 | 11/2014 | Fambach et al. | |
| 2015/0020512 | A1 * | 1/2015 | Lindemann | F16H 45/02 |
| | | | | 60/338 |
| 2015/0369069 | A1 | 12/2015 | Smith et al. | |
| 2017/0175866 | A1 * | 6/2017 | Basin | F16D 25/0638 |
| 2018/0335119 | A1 * | 11/2018 | Cai | F16H 45/02 |
| 2021/0102585 | A1 * | 4/2021 | Velayudham | F16H 45/02 |

FOREIGN PATENT DOCUMENTS

| | | |
|---|---|---|
| JP | 2017-125586 A | 7/2017 |
| KR | 10-2001-0107762 A | 12/2001 |

* cited by examiner

FRICTION DISC APPARATUS AND RELATED TORQUE CONVERTER ASSEMBLIES FOR USE WITH VEHICLES

FIELD OF THE DISCLOSURE

This disclosure relates generally to vehicles and, more particularly, to friction disc apparatus and related torque converter assemblies for use with vehicles.

BACKGROUND

Motor vehicles having automatic transmission functionality typically employ fluid couplings, such as torque converters, that are interposed between an engine and a vehicle transmission to facilitate transferring torque from the engine to the vehicle transmission. These torque converters may include a lockup clutch and a torsional vibration damper (e.g., a tuned spring and mass) that is operatively coupled to the lockup clutch and configured to reduce torsional vibrations or sudden rotational movements generated by the engine when the lockup clutch is engaged, thereby increasing part life for components of the vehicle transmission and/or a vehicle driveline.

SUMMARY

An aspect of the present disclosure includes a vehicle torque converter assembly. The vehicle torque converter assembly includes a torsional vibration damper including a plate. The vehicle torque converter assembly also includes a clutch operatively coupled to the torsional vibration damper. The clutch includes a friction disc having a tab that is coupled to a distal portion of the friction disc and extends axially away from the distal portion. The clutch also includes a piston configured to urge the friction disc into engagement with a torque converter cover to transfer torque from the torque converter cover to the torsional vibration damper. The tab includes (a) a first segment directly contacting a spring member or a spring seat of the torsional vibration damper and (b) a second segment, between the first segment and the distal portion of the friction disc, configured to slide against a guide surface of the plate to provide radial guidance to the friction disc.

Another aspect of the present disclosure includes a vehicle torque converter assembly. The vehicle torque converter assembly includes a torsional vibration damper including a plate. The vehicle torque converter assembly also includes a clutch having a friction disc. The friction disc includes a tab and an extension that are coupled to a distal portion of the friction disc. The tab is positioned at a first radius of the friction disc, and the extension or part thereof is positioned at a second radius of the friction disc different than the first radius. The extension is adjacent the tab and extends away from the tab along the second radius. The clutch also includes a piston configured to urge the friction disc into engagement with a torque converter cover to transfer torque from the torque converter cover to the torsional vibration damper. The tab is configured to engage a spring member or a spring seat of the torsional vibration damper. The extension is configured to slide against a guide surface of the plate to provide radial guidance to the friction disc.

The foregoing paragraphs have been provided by way of general introduction, and are not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

Figure 1:
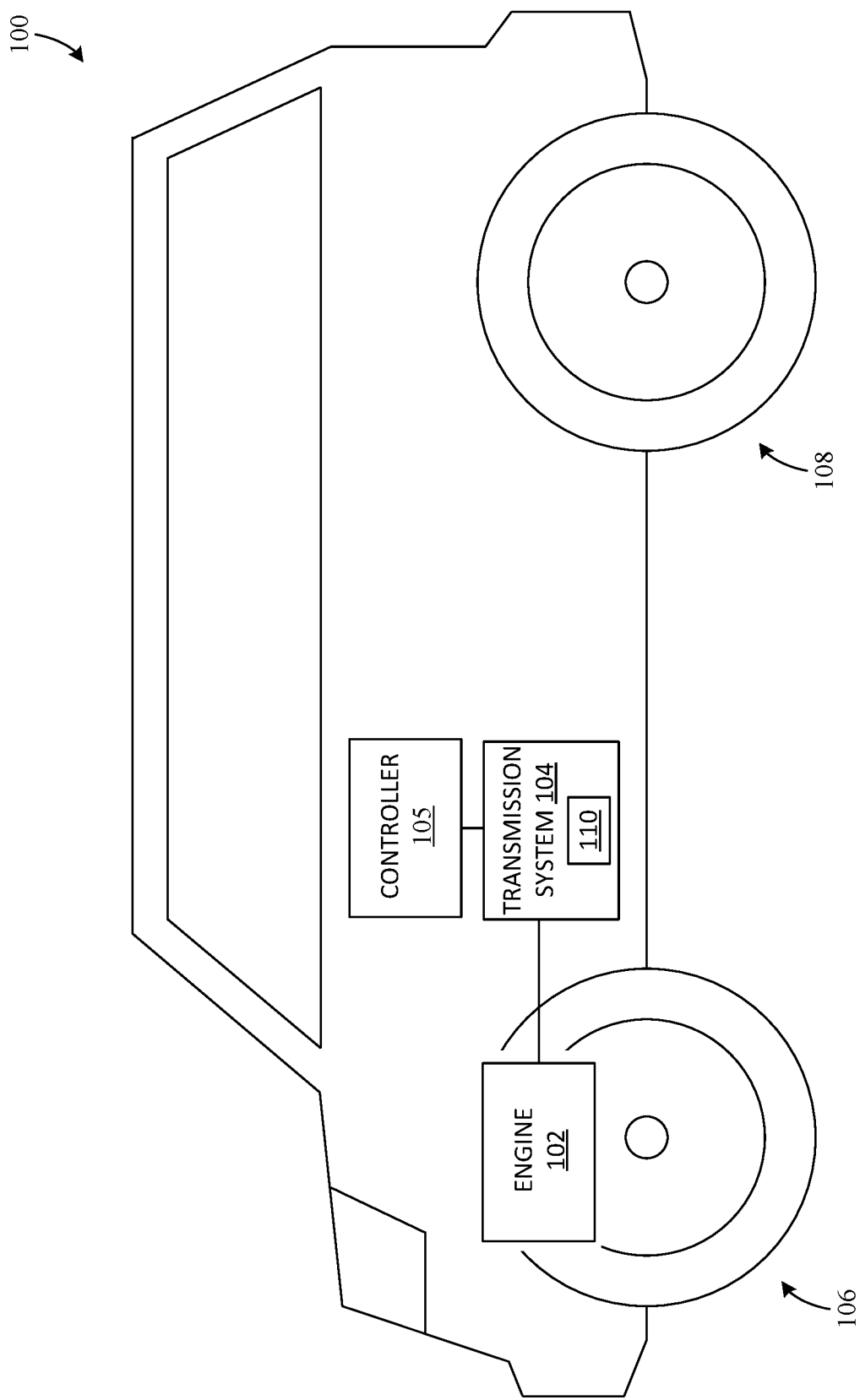
FIG. 1 is a schematic illustration of an example vehicle in which examples disclosed herein can be implemented.

Some vehicle torque converters include clutches (e.g., lockup clutches) having a known friction or clutch disc that engages with a cover plate. To ensure proper operation or functionality of the clutch, such a known friction disc is typically centered by mechanical design. For example, during clutch operation, the friction disc may slidably engage with a known vehicle torque converter component such as a damper plate in a torque converter housing. However, these known friction discs may fail to receive sufficient radial guidance from such torque converter components, which results in a lack of concentricity of the friction discs. Generally speaking, concentricity of a friction disc is very important for well-controlled lockup function. A lack of concentricity during clutch engagement may cause the generation of relatively high torque fluctuations in a stick-slip condition. Thus, these known friction discs and/or torque converter components, when implemented in a vehicle torque converter, may substantially reduce clutch performance and part life of associated clutch components housed in the vehicle torque converter.

Friction disc apparatus and related torque converter assemblies for use with vehicles are disclosed. Examples disclosed herein provide a compact, cost-effective solution to advantageously guide (e.g., radially guide) a friction disc of a vehicle torque converter clutch during clutch operation. Some disclosed examples provide an example vehicle torque converter assembly including a clutch (e.g., a lockup clutch) and an example damper (e.g., a torsional vibration damper) that are operatively coupled together and disposed a housing a vehicle torque converter. The disclosed clutch includes an example disc member (e.g., a friction disc) and an example piston configured to engage (e.g., slidably engage) the disc member, for example, together with a torque converter cover. Further, the disclosed damper includes a first damper plate (e.g., a retainer plate) and a second damper plate (e.g., a driven plate), each of which can facilitate providing guidance to the disc member. In particular, the disclosed disc member includes at least one tab that is coupled to a distal portion (e.g., an outer radial portion) of the disc member and extends axially away from the distal portion into a spring cavity of the damper. In some examples, the disclosed tab includes a first segment directly contacting a spring member or a spring seat of the damper and a second segment (e.g., a cylindrical portion) that is between the first segment and the distal portion of the disc member. In such examples, the second segment of the tab can be configured to slide against one or more example guide surfaces associated with the damper to provide radial guidance to the disc member, as will be discussed in greater detail below in connection with FIGS. 3A, 3B, and 4-10.

According to one or more examples disclosed herein, the first damper plate and/or the second damper plate can be used to implement one or more (e.g., all) of the disclosed guide surface(s). For example, the damper can include a driven plate, and a first disclosed guide surface associated with the damper includes an outer surface (e.g., an outer circumferential surface) of the driven plate that extends alongside an inner radial portion of the second segment of the tab. Additionally or alternatively, in another example, the damper can include a retainer plate, and a second disclosed guide surface associated with the damper includes an inner surface (e.g., an inner circumferential surface) of the retainer plate that extends alongside an outer radial portion of the second segment of the tab. In any case, the disclosed guide surface(s) can be positioned radially inward and/or radially outward relative to the second segment of the tab.

Additionally or alternatively, to facilitate providing the radial guidance to the disc member, some disclosed examples provide at least one extension that is coupled to the distal portion of the disc member, which can include one of an axial extension of the disc member, a radial extension of the disc member, or a combination thereof. In particular, the extension is adjacent the tab and extends away from the tab at or along a radius of the friction disc, for example, toward or to an additional tab of the disc member angularly spaced from the previously described tab. In such examples, the extension or part thereof (e.g., an axial segment that defines one or more centering surfaces) can be configured to slide against the guide surface(s) associated with the damper to provide radial guidance to the disc member, as will be discussed in greater detail below in connection with FIGS. 11A, 11B, and 12-19. In some examples, the second disclosed guide surface extends alongside a terminal portion (e.g., an end) of the extension and is positioned radially outward relative to the terminal portion. Additionally or alternatively, in another example, a third disclosed guide surface associated with the damper includes an outer surface (e.g., an outer circumferential surface) of the retainer plate that extends alongside the terminal portion and is positioned radially inward relative to the terminal portion.

Thus, the second segment of the tab and/or the extension can be advantageously used to center the disc member with the damper plate(s) during clutch operation, which improves associated centering characteristics compared to the above mentioned known friction discs and vehicle torque converter components. As a result, examples disclosed herein achieve low torque fluctuation in slip, well-controlled slip speed (e.g., desired speed vs actual slip speed), and smooth clutch engagement.

In some examples, a body (e.g., a core plate) of the disc member defines a preformed bend at or adjacent the distal portion. The distal portion of the disc member can include, for example, an end (e.g., an outer radial end) of the body or an area of the body proximate to the end. The first segment of the tab can be configured to always be in contact with the spring member or the spring seat of the damper for torque transfer. In such examples, the second segment defines a centering surface (e.g., an inner or outer circumferential surface) that may be cylindrically-shaped. In particular, the centering surface of the second segment can be used to center the disc member relative to the first damper plate and/or the second damper plate. Additionally or alternatively, in some examples, the disclosed extension includes an axial segment and a radial segment connected between the axial segment and the distal portion of the disc member. In such examples, the axial segment extends axially away from the radial segment along an axis to define a different centering surface (e.g., an inner or outer circumferential surface) of the extension that may be cylindrically-shaped. In particular, the centering surface of the extension can likewise be used to center the disc member relative to the first damper plate and/or the second damper plate. Further, the disclosed extension can be outside or inside of a diameter or radius of the tab, as discussed further below.

FIG. 1 is a schematic illustration of an example vehicle (e.g., a motor vehicle such as one of a car, a truck, a van, a sport utility vehicle (SUV), etc.) 100 in which examples disclosed herein can be implemented. According to the illustrated example of FIG. 1, the vehicle 100 includes an engine (e.g., an internal combustion engine) 102, a transmission system 104, a controller 105, and one or more wheels 106, 108 (sometimes referred to as road wheels), two of which are shown in this example, (i.e., a first or front wheel 106 and a second or rear wheel 108).

The transmission system 104 of FIG. 1 can be implemented, for example, using one of a two-pass automatic transmission, a three-pass automatic transmission, etc. In particular, the transmission system 104 of FIG. 1 is structured and/or configured to transfer torque from the engine 102 to one or more (e.g., all) of the wheel(s) 106, 108, for example, to move the vehicle 100. For example, the engine 102 generates an engine torque and, in response, the transmission system 104 controls an amount or degree of the engine torque that is provided to the wheel(s) 106, 108. In some examples, the transmission system 104 includes a hydraulic system 110 operable by the controller 105, which facilities control of a torque converter clutch (e.g., the clutch 302 shown in FIG. 3A) while the vehicle 100 is driving. The hydraulic system 110 can be implemented, for example, using a pump and one or more valves (e.g., one or more solenoid valves). In particular, the hydraulic system 110 of FIG. 1 is configured to convey a fluid (e.g., a pressurized hydraulic fluid) through a torque converter housing to change a state of the torque converter clutch, which is discussed in greater detail below.

The controller 105 of FIG. 1 can be implemented, for example, using an electronic control unit (ECU) such as a transmission control module (TCM). The vehicle controller 105 is communicatively coupled to the valve(s) of the hydraulic system 110, for example, via a transmission or signal wire, a bus (e.g., a controller area network (CAN) bus), radio frequency, etc. In particular, the controller 105 is configured to direct the hydraulic system 110 to change the state of the torque converter clutch based on a detected condition of the vehicle 100. For example, the vehicle controller 105 causes at least one of the valve(s) to open and/or close when the vehicle 100 is traveling at a relatively high speed. Further, to facilitate detecting such a condition of the vehicle, the controller 105 may be communicatively coupled to one or more sensors of the vehicle 100 to receive sensor data from the sensor(s).

Figure 2:
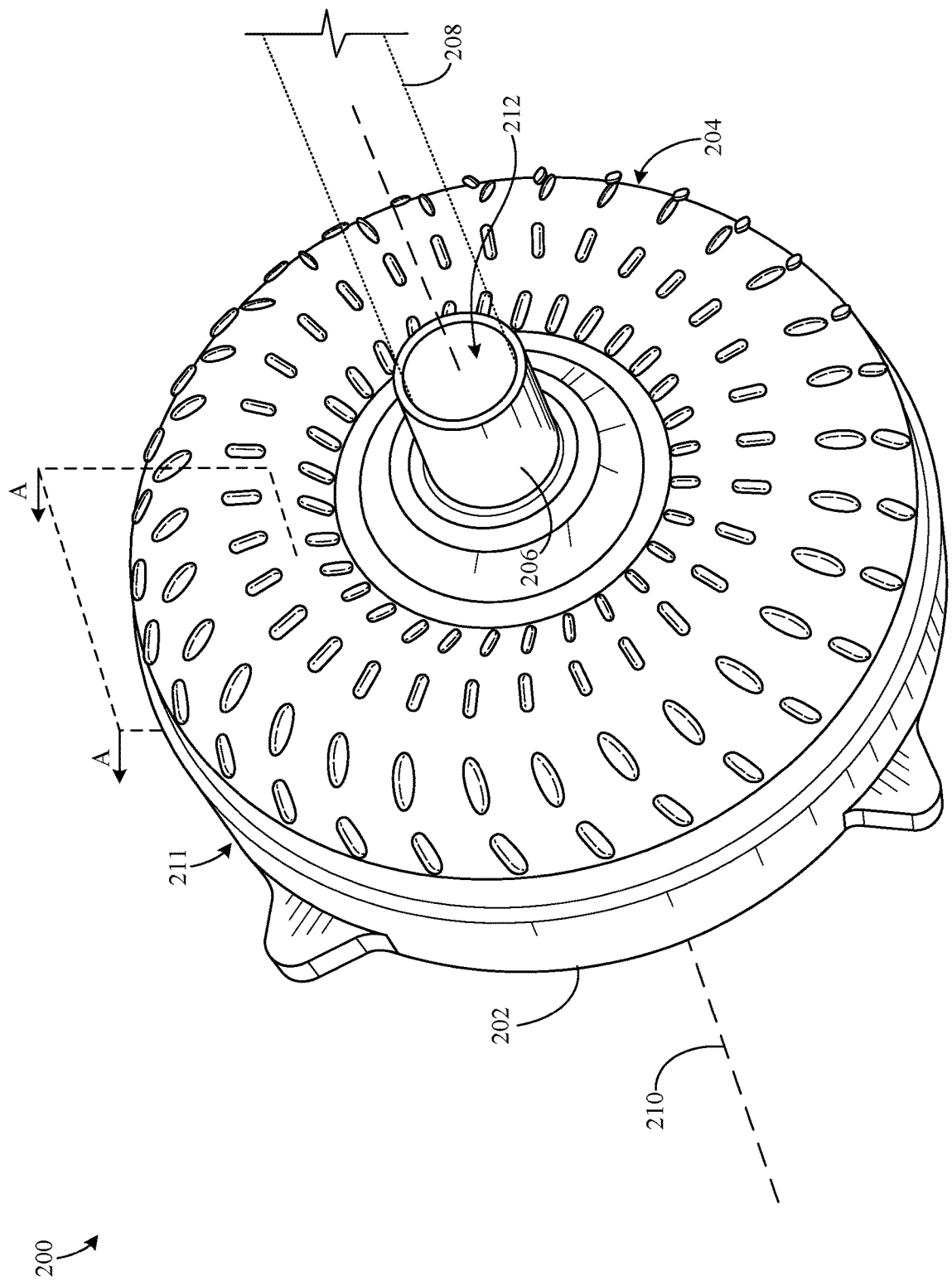
FIG. 2 is a view of an example torque converter in which examples disclosed herein can be implemented.

FIG. 2 is a view of an example torque converter 200 in which examples disclosed herein can be implemented. In some examples, the torque converter 200 of FIG. 2 is implemented in the vehicle 100 of FIG. 1 to facilitate transferring torque between the engine 102 and the transmission system 104. That is, in such examples, the vehicle 100 of FIG. 1 includes the torque converter 200. In particular, the torque converter 200 of FIG. 2 is configured to operatively couple between the engine 102 and the transmission system 104 of the vehicle 100 such that the engine torque is transmittable through the torque converter 200 from the engine 102 to the transmission system 104. According to the illustrated example of FIG. 2, the torque converter 200 includes a cover 202, an impeller 204, and a first hub (e.g. a drive hub) 206.

The torque converter 200 of FIG. 2 is changeable between a first operating mode (e.g., an unlocked or hydraulic operating mode) that is associated with a first operating characteristic of the torque converter 200 and a second operating mode (e.g., a lockup or locked operating mode) that is associated with a second operating characteristic of the torque converter 200 different relative to the first operating characteristic. When the torque converter 200 is in the first operating mode thereof, the torque converter 200 allows for substantial rotational or angular deviation between an output (e.g., a crankshaft) of the engine 102 and a first shaft (e.g., a transmission input shaft) 208 of the transmission system 104, for example, such that a rotational speed of the first shaft 208 is different relative to a rotational speed of the output of the engine 102. As a result, the engine 102 can remain in operation (e.g., the crankshaft of the engine 102 remains rotating) when the vehicle 100 is stopped (e.g., the first shaft 208 is not rotating) without causing the engine 102 to stall or adversely affecting the engine 102 in another manner. Further, in such examples, the torque converter 200 is configured to increase or multiply the engine torque provided to the transmission system 104 and/or the wheel(s) 106, 108 when the vehicle 100 drives at certain speeds (e.g., relatively low speeds).

In some examples, the torque converter 200 of FIG. 2 is configured to substantially prevent rotational or angular deviation of the cover 202 relative to the first shaft 208 when the torque converter 200 is in the second operating mode thereof, for example, via the clutch 302 described below. In such examples, the clutch 302, when engaged, provides a mechanical connection between the first shaft 208 and the engine 102. As a result, the torque converter 200 reduces or eliminates engine power loss typically associated with fluid drag during certain driving conditions (e.g., when the vehicle 100 is traveling at relatively high speeds). Additionally, when in the second operating mode or transitioning from the first operating mode to the second operating mode, the torque converter 200 is configured to dampen one or more torsional vibrations generated by the engine 102, for example, via the damper 304 described below.

The cover 202 of FIG. 2, which is sometimes referred to as a torque converter cover, is relatively non-rotatably (i.e., fixedly) coupled to a component (e.g., the crankshaft or a flywheel) associated with the engine 102 to receive the engine torque or output from the engine 102. Such coupling can be achieved, for example, via one or more example fasteners and/or one or more example fastening methods or techniques. That is, the component associated with the engine 102 supports one or more (e.g., all) of the cover 202, the impeller 204, and/or, more generally, the torque converter 200 when the cover 202 and the component of the engine 102 are assembled. In some examples, the torque converter 200 includes a flywheel that is interposed between the cover 202 and the crankshaft. Additionally, the cover 202 is relatively non-rotatably (i.e., fixedly) coupled to the impeller 204 to drive the impeller 204 via the engine torque, for example, via one or more example fasteners and/or one or more example fastening methods or techniques (e.g., welding). That is, the cover 202 and the impeller 204, together, are rotatable relative to a first axis (e.g., an axis of rotation) 210 associated with the torque converter 200 in the same rotational direction (e.g., clockwise or counterclockwise). Further, the cover 202 and the impeller 204 form and/or define a housing (e.g., a substantially sealed housing) 211 of the torque converter 200 in which one or more torque converter components are disposed.

The impeller 204 of FIG. 2 is structured and/or configured to control a parameter (e.g., a flow rate, a fluid pressure, etc.) of a fluid in the torque converter housing 211 when the impeller 204 rotates relative to the first axis 210, for example, via one or more fins, one or more blades, one or more vanes, etc., and/or any other suitable fluid flow control member positioned on the impeller 204. Additionally, the impeller 204 is relatively non-rotatably (i.e., fixedly) coupled to the cover 202 to receive the engine torque therefrom, as previously described. In some examples, in response to the impeller 204 rotating relative to the first axis 210 when the torque converter 200 is in the first operating mode thereof, the torque converter 200 generates an output or a torque (sometimes referred to as an output torque) for the transmission system 104, a magnitude of which is based on, for example, any of the engine torque, a speed of the vehicle, torus parameters, parameters of the fluid flow control members, fluid parameters, fluid properties, etc.

The first hub 206 of FIG. 2 is connected to the pump of the hydraulic system 110. In particular, rotation of the first hub 206 relative to the first axis 210 causes the pump to change a parameter (e.g., a flow rate, a fluid pressure, etc.) of at least a portion of the fluid, for example, in one of (a) a component (e.g., a gearbox) of the transmission system 104, (b) a fluid path or channel associated with the first shaft 208, (c) the housing 211, or (d) a combination thereof. Additionally, in some examples, the first hub 206 of FIG. 2 is configured to removably receive the first shaft 208 associated with the vehicle transmission system 104 via an aperture 212 defined by the first hub 206. As shown in FIG. 2, the first shaft 208 extends at least partially into the housing 211 through the aperture 212.

The first shaft 208 of FIG. 2 is configured to couple between the torque converter 200 and the component of the transmission system 104. In particular, the first shaft 208 is configured to transfer the output torque from the torque converter 200 to the transmission system 104, thereby driving the wheel(s) 106, 108. In some examples, the first shaft 208 is inserted in the first hub 206 to connect the first shaft 208 to an output portion of the torque converter 200 such as, for example, the second hub 310 described below. In such examples, the first shaft 208 and the output portion are relatively non-rotatably (i.e., fixedly) coupled together, for example, via a splined connection.

Figure 3A:
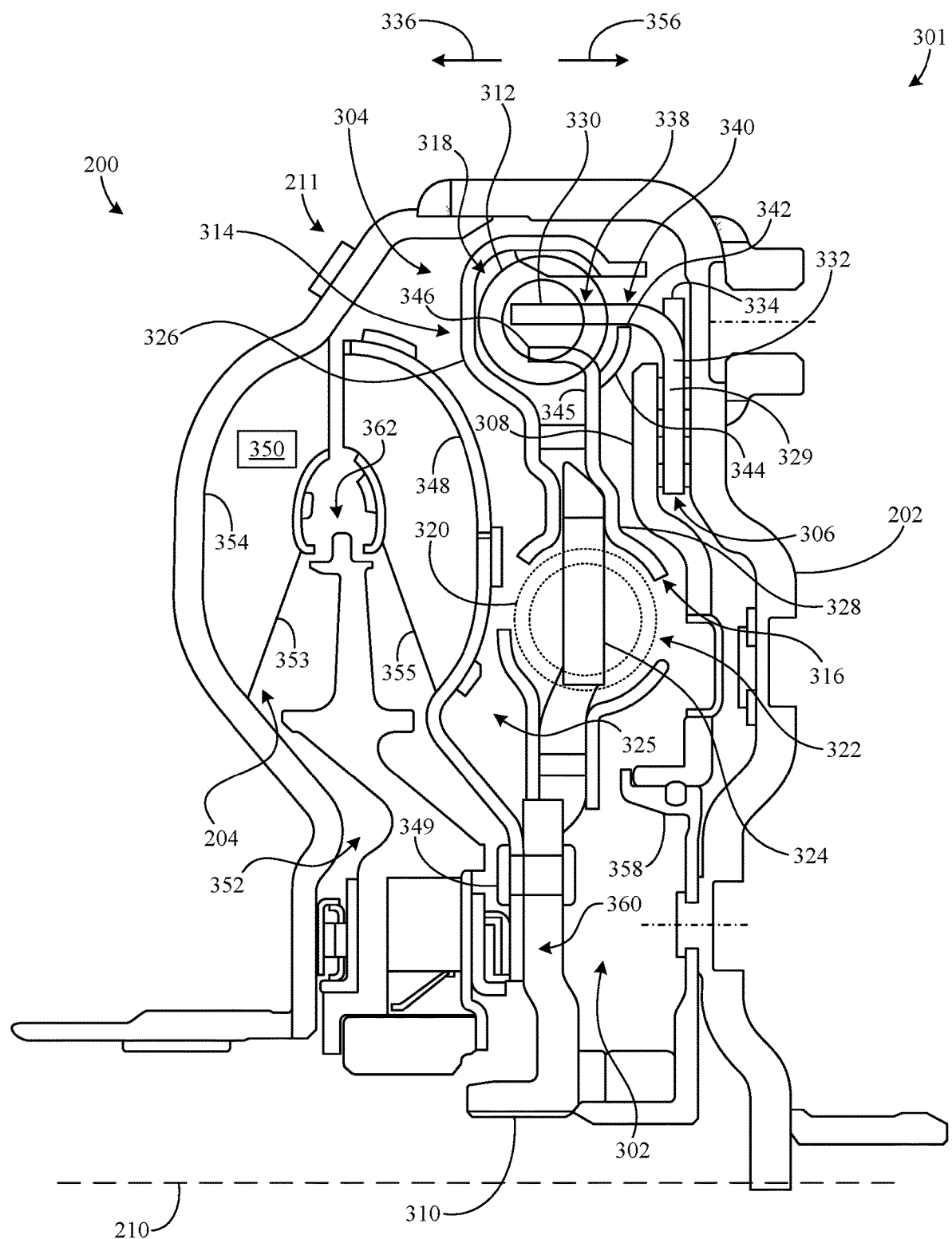
FIG. 3A is a partial cross-sectional view of the example torque converter along line A-A of FIG. 2 and shows a vehicle torque converter assembly in accordance with the teachings of this disclosure.

FIG. 3A is a partial cross-sectional view of the torque converter 200 along line A-A of FIG. 2 and shows an example vehicle torque converter assembly 301 in accordance with the teachings of this disclosure. The vehicle torque converter assembly 301 of FIG. 3A includes an example clutch (e.g., a lockup clutch) 302 and an example damper (e.g., a torsional vibration damper) 304. The clutch 302 and the damper 304 of FIG. 3A are positioned in the housing 211 of the torque converter 200. According to the illustrated example of FIG. 3A, the clutch 302 is operatively coupled to the damper 304. The clutch 302 of FIG. 3A includes an example disc member (e.g., a friction disc) 306 and an example piston 308. The piston 308 configured to urge the disc member 306 into engagement with the cover 202 to transfer torque from the cover 202 to the damper 304. In particular, the disc member 306 is configured to receive radial guidance from part of the damper 304 (e.g., via a driven plate and/or a retainer plate) during clutch operation, which will be discussed in greater detail below in connection with FIGS. 3B, 4-10, 11A, 11B and 12-19.

In the example of FIG. 3A, the damper 304 is operatively coupled to the clutch 302 and configured to receive a first torque (e.g., a substantially unregulated torque) from the clutch 302, for example, when the clutch 302 is engaged. The damper 304 of FIG. 3A can include, for example, a torsional vibration damper configured for use with the vehicle torque converter 200. The first torque may correspond to the engine torque generated by the engine 102. In particular, in response to receiving the first torque, the damper 304 of FIG. 3A is configured to dampen one or more torsional vibrations (e.g., generated by the engine 102) in the first torque, thereby providing a second torque (e.g., a substantially regulated torque) to the output portion of the vehicle torque converter 200 different relative to the first torque. The output portion can include a second hub (e.g., a turbine hub) 310 of the vehicle torque converter 200. As shown in FIG. 3A, the second hub 310 of the vehicle torque converter 200 is positioned radially inward relative to the damper 304. In some examples, the damper 304 of FIG. 3A is operatively interposed between the clutch 302 and the second hub 310 such that, when the clutch 302 is engaged, torque is transmittable through the damper 304 from the clutch 302 to the second hub 310.

To facilitate dampening the torsional vibration(s), the damper 304 includes one or more primary spring members 312, one of which is shown in this example. That is, the damper 304 of FIG. 3A includes a first primary spring member 312 such as, for example, a compression spring (e.g., a coil spring), etc., and/or any other suitable spring member useable with a damper. The first primary spring member 312 is operatively coupled to the disc member 306 and (a) the first plate 314 and/(b) the second plate 316. Further, to facilitate carrying the primary spring member(s) 312 and/or transmitting load(s) through the primary spring member(s) 312, the damper 304 also includes one or more plates 314, 316, two of which are shown in this example. That is, the damper 304 of FIG. 3A includes a first plate (e.g., a retainer plate) 314 and a second plate (e.g., a driven plate) 316. In particular, angular movement or rotation of the disc member 306 relative to the plate(s) 314, 316 about the first axis 210 changes state(s) of the primary spring member(s) 312 to generate a damping effect. For example, the first primary spring member 312 of FIG. 3A is configured to change between a first spring state (e.g., an uncompressed or expanded state) and a second spring state (e.g., a compressed state), thereby substantially reducing harsh or sudden angular movement(s) of the disc member 306 relative to the plate(s) 314, 316.

Each of the first and second plates 314, 316 of FIG. 3A can be implemented, for example, using an annular-shaped body. In some examples, the first plate 314 of FIG. 3A includes a retainer plater and is sometimes referred to as a first damper plate, and the second plate 316 of FIG. 3A includes a driven plate and is sometimes referred to as a second damper plate. Further, the first plate 314 and/or the second plate 316 can be constructed of one or more materials having suitable properties (e.g., a relatively high strength and/or rigidity) such as, for example, one or more metals (e.g., steel, carbon steel, iron, aluminum, etc.), one or more composites, etc., any other material(s) suitable for use with vehicle torque converters, or a combination thereof.

In some examples, the first plate 314 of FIG. 3A at least partially defines a primary cavity (e.g., a spring cavity) 318 in which the first primary spring member 312 of the damper 304 is positioned. As shown in FIG. 3A, the first primary spring member 312 is centrally disposed in the primary cavity 318. Accordingly, the primary cavity 318 can be sized and/or shaped to receive the first primary spring member 312. In some examples, the primary cavity 318 is annular. In such examples, the primary cavity 318 extends entirely around the first axis 210 at a radius of the damper 304. Additionally or alternatively, the primary cavity 318 extends only partially around the first axis 210 at the radius, for example, such that the primary cavity 318 is substantially arc-shaped and/or forms an arc.

The second plate 316 of FIG. 3A is connected to a vehicle torque converter output, for example, directly or via one or more intermediate components. In some examples, the second plate 316 is connected to the second hub 310 of the vehicle torque converter 200 via one or more auxiliary spring members 320. In such examples, the damper 304 includes the auxiliary spring member(s) 320 to further improve damper performance, one of which is shown in this example (i.e., a first auxiliary spring member 320). Additionally or alternatively, the first plate 314 can be similarly connected to the vehicle torque converter output. In such examples, each of the auxiliary spring member(s) 320 of FIG. 3A is operatively coupled to the second hub 310 and (a) the first plate 314 and/or (b) the second plate 316. In particular, rotation of the plate(s) 314, 316 relative to the second hub 310 about the first axis 210 changes state(s) of the auxiliary spring member(s) 320 to generate an additional damping effect. For example, the first auxiliary spring member 320 of FIG. 3A is configured to change between the first spring state and the second spring state, thereby substantially reducing harsh or sudden angular movement(s) of the second plate(s) 314, 316 relative to the second hub 310.

In some examples, to facilitate carrying the auxiliary spring member(s) 320, the first plate 314 and/or the second plate 316 can define one or more auxiliary cavities (e.g., a spring cavities) 322 in which respective one(s) of the auxiliary spring member(s) 320 is/are positioned. As shown in FIG. 3A, the first auxiliary spring member 320 is centrally disposed in a first auxiliary cavity 322.

In the illustrated example of FIG. 3A, the first and second plates 314, 316 are relatively non-rotatably (i.e., fixedly) coupled together, for example, via one or more fasteners and/or one or more fastening methods or techniques. Further, the first plate 314 and/or the second plate 316 is/are configured to partially rotate relative to the second hub 310. For example, the second plate 316 of FIG. 3A is rotatable relative to the second hub 310 about the first axis 210 across a predefined angle associated with damper travel in a first rotational direction (e.g., clockwise) and a second rotational direction (e.g., counterclockwise) opposite to the first rotational direction.

In some example, the second hub 310 of the torque converter 200 includes a flange portion 324, which facilitates transmitting torque to the second hub 310 from (a) the damper 304 and/or (b) an example turbine 325. The flange portion 324 of FIG. 3A is positioned on the second hub 310 and extends radially outward relative to the first axis 210 toward the damper 304. The flange portion 324 of FIG. 3A is relatively non-rotatably coupled to the second hub 310, for example, via one or more fasteners and/or one or more fastening methods or techniques. In such examples, the second hub 310 and the flange portion 324 thereof form and/or define a one-piece component. In particular, the flange portion 324 of FIG. 3A passes into the auxiliary cavity 322 to receive the first auxiliary spring member 320. In some examples, the flange portion 324 is configured to receive a load from the first auxiliary spring member 320 (e.g., when the first auxiliary spring member 320 is compressed), which can generate the second torque of the damper 304 previously described. Additionally or alternatively, the flange portion 324 of FIG. 3A can be configured to provide guidance (e.g., axial guidance and/or radial guidance) to the first plate 314 and/or the second plate 316 during clutch operation.

According to the illustrated example of FIG. 3A, the first plate 314 includes a first body (e.g., an annular body) 326. Similarly, the second plate 316 of FIG. 3A includes a second body (e.g., an annular body) 328. In some examples, each of the first and second bodies 326, 328 is relatively rotatably coupled to second hub 310, for example, via the flange portion 324. The second hub 310 of FIG. 3A can be rotatably supported by the torque converter housing 211. In such examples, the first body 326 and the flange portion 324 are configured to slide against each other, which provides the guidance to the first plate 314. Additionally or alternatively, in some examples, the second body 328 and the flange portion 324 are configured to slide against each other, which provides the guidance to the second plate 316. In particular, when an angular speed of the second hub 310 is different (e.g., greater or less) relative to an angular speed of the first or second plate 314, 316, an outer radial end of the flange portion 324 slidably engages the first or second plate 314, 316. Such engagement of the flange portion 324 and the plate(s) 314, 316 substantially maintains a position of the damper 304 relative to the housing 211. In this manner, the second hub 310 or the flange thereof 324 rotatably support the first primary spring member 312, the first plate 314, the second plate 316, and/or, more generally, the damper 304. In the illustrated example of FIG. 3A, the outer radial end of the flange portion 324 is interposed between the first and second plates 314, 316. In some examples, the first and second plates 314, 316 are spaced from each other such that the first and second plates 314, 316 define a space in which the outer radial end of the flange portion 324 is position.

The disc member 306 of the clutch 302 can be implemented, for example, using an annular-shaped body. Further, the disc member 306 can be constructed of one or more materials having suitable properties (e.g., a relatively high strength and/or rigidity) such as, for example, one or more metals (e.g., steel, carbon steel, iron, aluminum, etc.), one or more composites, etc., any other material(s) suitable for use with vehicle torque converters, or a combination thereof. In some examples, the disc member 306 includes a friction disc, which is sometimes referred to a clutch disc and/or a core plate. As shown in FIG. 3A, a third body (e.g., an annular body such as core plate) 329 of the disc member 306 extends between surfaces (e.g., annular surfaces) of the piston 308 and the cover 202 that face each other. In some examples, the third body 329 of FIG. 3A can be a core plate of the disc member 306 configured to withstand relatively high frictional forces and/or heat.

According to the illustrated example of FIG. 3A, the disc member 306 includes a first tab 330, which better enables the disc member 306 to change the state(s) of the primary spring member(s) 312 together with the plate(s) 314, 316. The first tab 330 of the disc member 306 is sometimes referred to as a primary tab or a first primary tab. The first tab 330 of the disc member 306 is coupled to a distal portion 332 of the disc member 306. The distal portion 332 can include, for example, an area of the disc member 306 that is at, adjacent, or proximate to an outer end (e.g., an outer radial end that may include an outer circumferential surface) of the third body 329. In some examples, the distal portion 332 of the disc member 306 corresponds to an outer radius of the third body 329 and, in such examples, is sometimes referred to as an outer radial portion of the disc member 306. As shown in FIG. 3A, the first tab 330 extends axially away from the distal portion 332 of the disc member 306, for example, in a first axial direction 336 toward the impeller 204.

Additionally, the disc member 306 of FIG. 3A can include a flange portion 334 coupled to the distal portion 332 of the disc member 306 adjacent the first tab 330. The flange portion 334 of the disc member 306 extends away from the distal portion 332 of the disc member 306 radially outward relative to the first axis 210. In some examples, the flange portion 334 can be sized and/or shaped to form an extension of the disc member 306 that facilitates centering the disc member 306 relative to the damper plate(s) 314, 316 when the clutch 302 is in operation, which is discussed in greater detail below in connection with FIGS. 11A, 11B, and 12-19.

According to the illustrated example of FIG. 3A, the first tab 330 includes a first segment 338 directly contacting the first primary spring member 312 or a seat (e.g., the seat 426 shown in FIG. 4) of the damper 304. Further, the first tab 330 also includes a second segment 340 different from the first segment 338, which facilitates centering the disc member 306 relative to the damper plate(s) 314, 316 when the clutch 302 is in operation. The second segment 340 of the first tab 330 is connected to the first segment 338 and/or adjacent the first segment 338. In particular, the second segment 340 of FIG. 3A is configured to slide against a primary guide surface associated with the damper 304 to provide radial guidance to the disc member 306, which centers the disc member 306 relative to the damper plate(s) 314, 316. More particularly, the second segment 340 is between the first segment 338 and the distal portion 332 of the disc member 306, which improves radial guiding functionality. The primary guide surface can be implemented using the first plate 314 and/or the second plate 316. In some examples, the primary guide surface includes a first outer surface (e.g., an outer circumferential surface of the driven plate) 342 of the second plate 316 that extends alongside the second segment 340. Accordingly, the first outer surface 342 of the second plate 316 is sometimes referred to as a first guide surface of the second plate 316. In such examples, the primary guide surface associated with the damper 304 is positioned radially inward relative to the second segment 340. As shown in FIG. 3A, the first outer surface 342 of the second plate 316 is positioned radially inward relative to the second segment 340.

According to the illustrated example of FIG. 3A, the second plate 316 includes a first example annular portion 344 on which the first guide surface 342 of the second plate 316 is positioned. That is, the first annular portion 344 can form and/or define the first guide surface 342 of the second plate 316 or at least a portion thereof. In some examples, the first annular portion 344 curves away from the second segment 340 of the first tab 330 (e.g., radially inward relative to the first axis 210) to partially define the primary cavity 318 of the damper 304. Accordingly, in such examples, part of the first plate 314 and the first annular portion 344, together, provide the primary cavity 318. In the illustrated example of FIG. 3A, the first annular portion 344 is coupled to a distal portion 345 of the second plate 316.

In some examples, the second plate 316 includes a first auxiliary tab 346, which better enables the plate(s) 314, 316 to change the state(s) of the primary spring member(s) 312 together with the disc member 306. The first auxiliary tab 346 of FIG. 3A is coupled to the distal portion 345 of the second plate 316 adjacent the first annular portion 344. In particular, the first auxiliary tab 346 of the second plate 316 is engaged with and/or configured to engage the primary spring member(s) 312.

As shown in FIG. 3A, the second body 328 of the second plate 316 extends away from the first auxiliary tab 346 radially inward relative to the first axis 210 alongside a surface (e.g., an annular surface) of the piston 308 toward a second end (e.g., a proximal end) of the second body 328 opposite to the first end. On the other hand, the first body 326 of the first plate 314 extends around the first primary spring member 312 and alongside a housing or first shell (e.g., a turbine shell) 348 of the turbine 325 toward an end (e.g., a proximal end) of the first body 326.

The turbine 325 of FIG. 3A is relatively non-rotatably (i.e., fixedly) coupled to the second hub and/or the flange portion 324 thereof, for example, via one or more fasteners and/or one or more fastening methods or techniques. For example, as shown in FIG. 3A, an example fastener 349 is extending through the first shell 348 of the turbine 325. As such, torque is transferrable from the turbine 325 to the second hub 310, for example, when the torque converter 200 is in the first operating mode.

According to the illustrated example of FIG. 3A, the torque converter 200 includes the impeller 204, the clutch 302, the damper 304, the turbine 325, and an example fluid (e.g., torque fluid) 350, each of which is disposed in a housing cavity (e.g., a substantially sealed cavity) 352 formed by the torque converter housing 211. In particular, the turbine 325 of FIG. 3A is configured to receive the fluid 350 from the impeller 204, thereby generating an output torque of the torque converter 200 that is provided to the transmission system 104. For example, the impeller 204 includes first fluid flow control members (e.g., fins, blades, vanes, etc.) 353 and a housing or second shell (e.g., an impeller shell) 354 on which the first fluid flow control members 353 are positioned. The first fluid flow control members 353 of the impeller 204 are radially distributed relative to the first axis 210 and can extend radially inward or outward relative to the first axis 210. Similarly, the turbine 325 of FIG. 3A includes second fluid flow control members (e.g., fins, blades, vanes, etc.) 355 positioned on the first shell 348 of the turbine 325. The second fluid flow control members 355 of the turbine 325 are radially distributed relative to the first axis 210 and extend radially outward relative to the first axis 210. As the first fluid flow control members 353 of the impeller 204 rotate together with the cover 202 relative to the first axis 210, the fluid 350 is urged and/or pumped radially outward relative to the first axis 210 toward the second fluid flow control members 355. That is, the first fluid flow control members 353 direct a flow of the fluid 350 onto the second fluid flow control members 355 such that the fluid 350 imparts fluid force(s) on the second fluid flow control members 355. The turbine 325 of FIG. 3A generates the output torque of the torque converter 200 as a result of such fluid interaction, a degree of which is based on one or more parameters associated with the torque converter 200 such as, for example, one or more of a rotational speed of the impeller 204, a rotational speed of the turbine 325, angles of the respective fluid flow control members 353, 355, lengths of the respective fluid flow control members 353, 355, properties (e.g., viscosity) of the fluid 350, etc.

In the illustrated example of FIG. 3A, the clutch 302 includes the piston 308 to facilitate clutch operation. In some examples, the piston 308 of FIG. 3A is moveable in the first axial direction 336 and/or a second axial direction 356 (e.g., based on fluid pressure differential applied to the piston 308 by the fluid 350), which facilitates changing a state of the clutch 302. The second axial direction 356 is opposite to the first axial direction 336. In particular, the clutch 302 of FIG. 3A is changeable between a first state (e.g., a disengaged state) thereof and a second state (e.g., a fully engaged state or a partially engaged state) thereof, for example, based on a flow of the fluid 350 through the housing 211 provided by the hydraulic system 110. The first state of the clutch 302 corresponds to the first operating mode of the torque converter 200. That is, the clutch 302 provides the first operating mode of the torque converter 200 when the clutch 302 is in the first state thereof. Further, the second state of the clutch 302 corresponds to the second operating mode of the torque converter 200. That is, the clutch 302 provides the second operating mode of the torque converter 200 when the clutch 302 is in the second state thereof.

The piston 308 of FIG. 3A can be implemented, for example, using an annular-shaped body. The piston 308 of FIG. 3A is sized and/or shaped to fit between the damper 304 and the disc member 306. According to the illustrated example of FIG. 3A, the piston 308 is supported by a portion (e.g., a hub such as a collar hub fixedly coupled to the cover 202) 358 of the torque converter 200 such that the piston 308 is rotatable relative to the portion 358 of the torque converter 200 about the first axis 210. In some examples, an inner surface (e.g., an inner circumferential surface) of the piston 308 is configured to slide axially along an outer surface (e.g., an outer circumferential surface) of the portion 358 toward and/or away from the disc member 306. Further, as shown in FIG. 3A, the piston 308 of FIG. 3A has a face (e.g., an annular surface) proximate to a first face (e.g., an annular surface) of the disc member 306 that disposed on the third body 329.

On the other hand, the disc member 306 of FIG. 3A is sized and/or shaped to fit between the piston 308 and the cover 202. According to the illustrated example of FIG. 3A, the disc member 306 or the third body 329 thereof is supported by the first annular portion 344 of the second plate 316 such that the disc member 306 is rotatable relative to the first annular portion 344 about the first axis 210. Further, as shown in FIG. 3A, the disc member 306 includes a second face (e.g., an annular surface) disposed on the third body 329 and proximate to a face (e.g., an annular surface) of the cover 202. The first face and the second face of the disc member 306 are positioned on opposite sides of the third body 329. The first face faces the face of the piston 308, and the second face faces the face of the cover 202.

In some examples, to provide the second state of the clutch 302 during a lockup on operation of the torque converter 200, the face of the piston 308 of FIG. 3 is configured to engage (e.g., slidably engage) the first face of the disc member 306 to generate friction. Further, the second face of the disc member 306 is configured to engage (e.g., slidably engage) the face of the cover 202 to generate friction. Such frictional engagement of the piston 308, the disc member 306, and/or the cover 202 provides a mechanical connection between the cover 202 and the disc member 306 and, consequently, between the cover 202 and the damper 304. For example, when the controller 105 initiates and/or executes the lockup on operation, the fluid 350 urges the piston 308 in the second axial direction 356 to clamp and/or squeeze the disc member 306 between the cover 202 and the piston 308, thereby transferring a torque (e.g., the engine torque generated by the engine 102) from the cover 202 to the damper 304. In such examples, the controller 105 directs the hydraulic system 110 to control the fluid 350 in the housing 211 to apply a first differential fluid pressure to the piston 308 that causes the piston 308 to move in the second axial direction 356 such that the face of the piston 308 and the first face of the disc member 306 contact and/or impart frictional forces on each other. Further, the first differential fluid pressure applied to the piston 308 also causes the second face of the disc member 306 and the face of the cover 202 to contact and/or impart frictional forces on each other. In this manner, disclosed examples actuate the piston 308 of FIG. 3A to provide the second state of the clutch 302. Such a state change of the clutch 302 may cause the disc member 306 and the first primary tab 330 to rotate about the first axis 210 relative to the first plate 314 and/or the second plate 316.

On the other hand, in some examples, to provide the first state of the clutch 302 during a lockup off operation of the torque converter 200, the face of the piston 308 of FIG. 3A is configured to disengage (e.g., separate) from the first face of the disc member 306. Additionally or alternatively, the second face of the disc member 306 is configured to disengage (e.g., separate) from the face of the cover 202. As a result of such disengagement, the cover 202 substantially disconnects from the disc member 306 and, consequently, substantially disconnects from the damper 304. That is, the friction associated with the piston 308, the disc member 306, and/or the cover 202 is substantially reduced and/or eliminated. For example, when the controller 105 initiates and/or executes the lockup off operation, the fluid 350 urges the piston 308 in the first axial direction 336 away from the disc member 306 to disengage the piston 308 from the disc member 306, thereby substantially ceasing torque transfer between the cover 202 and the damper 304. In such examples, the controller 105 directs the hydraulic system 110 to control the fluid 350 in the housing 211 to apply a second differential fluid pressure to the piston 308, different from the first differential fluid pressure, that causes the piston 308 to move in the first axial direction 336. In this manner, disclosed examples also actuate the piston 308 of FIG. 3A to provide the first state of the clutch 302. The resulting second differential fluid pressure may cause the piston 308 to completely separate from the disc member 306 whereby no portion of the piston 308 contacts the disc member 306. For example, a relatively small gap may exist between the piston 308 and the disc member 306 when the clutch 302 is in the first state thereof. However, in some examples, the second differential fluid pressure may allow the piston 308 to slightly contact the disc member 306 whereby a substantially negligible amount of friction is generated by the piston 308 and the disc member 306.

In some examples, when in the second state and/or transitioning from the first state to the second state, the clutch 302 is configured to slip (e.g., at a gradual decreasing angular rate), for example, in a substantially controlled manner. For example, the disc member 306 slides against the piston 308 and the cover 202 as the first differential fluid pressure applied to the piston 308 increases. In such examples, the controller 105 is configured to direct the hydraulic system 110 to adjust such slipping of the clutch 302, for example, by particularly increasing the first differential fluid pressure during a time interval. Further, when the first differential fluid pressure is at or above a locking threshold (e.g., a value corresponding to a particular differential fluid pressure), the clutch 302 ceases slipping and/or locks up. For example, the piston 308, the disc member 306, and the cover 202 relatively non-rotatably (i.e., fixedly) couple together (e.g., temporarily) while first differential fluid pressure remains at or above the locking threshold.

Additionally, in some examples, to facilitate connecting the transmission system 104 to the torque converter 200, the torque converter 200 includes the second hub 310, which is sometimes referred to as a vehicle torque converter output. The second hub 310 of FIG. 3A is sized, shaped, structured, and/or otherwise configured to receive the first shaft 208 and provide the output torque generated by the turbine 325 to the first shaft 208. In such examples, the second hub 310 defines an inner surface (e.g., an inner circumferential surface) having grooves that are positioned thereon, and the first shaft 208 defines an outer surface (e.g., an outer circumferential surface) having splines that are positioned thereon. In such examples, the grooves of the second hub 310 receive the splines of the first shaft 208, thereby relatively non-rotatably (i.e., fixedly) coupling the second hub 310 to the first shaft 208. In other words, when the vehicle 100 is produced, the second hub 310 and the first shaft 208 are splined together such that the first shaft 208 and the second hub 310 are rotatable together relative to the first axis 210 in the same direction.

In some examples, the second hub 310 is relatively rotatably coupled the housing 211, for example, via one or more bearings (e.g., thrust bearings) 360 operatively interposed between the second hub 310 and (a) the impeller 204 and/or (b) a stator 362 of the torque converter 200. Additionally or alternatively, the second hub 310 can be rotatably supported by a different hub (e.g., a collar hub) adjacent to the second hub 310 and coupled to the cover 202.

Figure 3B:
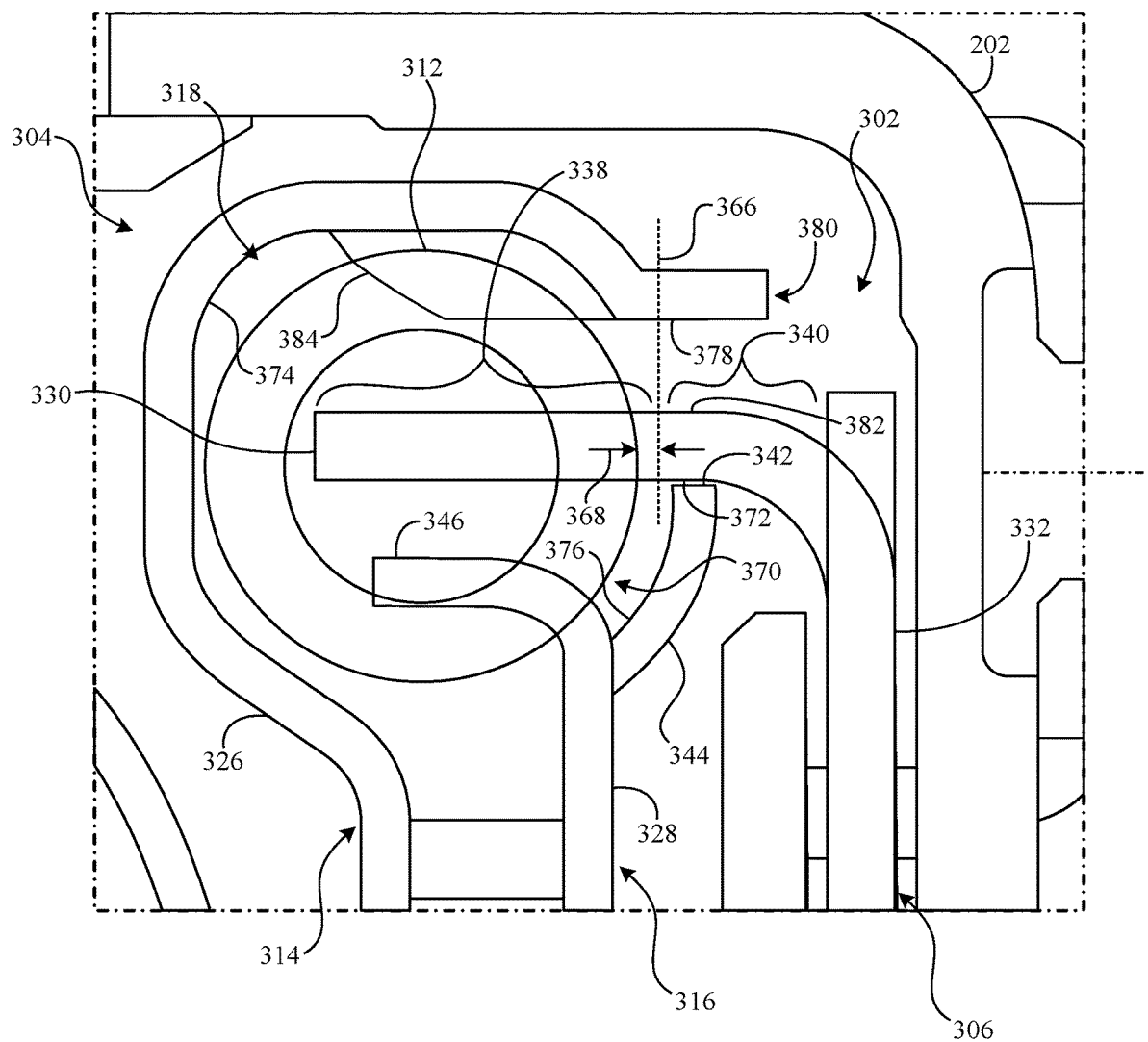
FIG. 3B is an enlarged partial-view of an example clutch and an example damper of the vehicle torque converter assembly of FIG. 3A.

FIG. 3B is an enlarged partial-view of the clutch 302 and the damper 304 of FIG. 3A. According to the illustrated example of FIG. 3B, the second segment 340 of the first primary tab 330 is interposed between the first primary spring member 312 and the distal portion 332 of the disc member 306 such that the second segment 340 does not overlap with the first primary spring member 312 or any portion thereof. As shown in FIG. 3B, only the first segment 338 of the first primary tab 330 overlaps with the first primary spring member 312. In some examples, an interface 366 (as represented by the dotted/dashed line of FIG. 3B) of the first and second segments 338, 340 is spaced by an axial distance 368 from the first primary spring member 312 or an outer surface of the first primary spring member 312. The interface 366 of FIG. 3B can be one of a point, a line, or plane at which the first and second segments 338, 340 meet. In such examples, the interface 366 of FIG. 3B can form a boundary (e.g., a common boundary) of the first and second segments 338, 340.

In the illustrated example of FIG. 3B, the first annular portion 344 is positioned on the second body 328 adjacent the first auxiliary tab 346 of the second plate 316. The first annular portion 344 of FIG. 3B extends and/or curves around a portion (e.g., an inner radial portion) 370 of the first primary spring member 312 and away from the second body 328 (e.g., radially outward relative to the first axis 210) toward the first guide surface 342 of the second plate 316. In some examples, the disc member 306 includes a first centering surface 372 positioned on the second segment 340 of the first primary tab 330, which can interact with the first annular portion 344 and/or one or more different annular portions 422, 424 (shown in FIG. 4) of the second plate 316. The first centering surface 372 includes and/or corresponds to an inner surface (e.g., an inner circumferential surface) defined by the second segment 340 but not the first segment 338. In particular, in such examples, the second segment 340 or the first centering surface 372 thereon is configured to slide against the first annular portion 344 or the first guide surface 342 thereon to provide radial guidance to the disc member 306.

In some examples, the first plate 314 includes a first cavity surface 374 facing the first primary spring member 312, and the second plate 316 includes a second cavity surface 376 facing the first primary spring member 312 and/or the first cavity surface 374. In such examples, the first and second cavity surfaces 374, 376, together, form and/or define the primary cavity 318. As shown in FIG. 3B, the second cavity surface 376 can be positioned on the first annular portion 344.

In some examples, in addition or alternatively to the first guide surface 342 of the second plate 316, the primary guide surface associated with the damper 304, which facilitates providing the radial guidance to the disc member 306, includes a first inner surface (e.g., an inner circumferential surface of the retainer plate) 378 of the first plate 314 that extends alongside the second segment 340 of the first primary tab 330. Accordingly, the first inner surface 378 of the first plate 314 is sometimes referred to as a first guide surface of the first plate 314. In such examples, the first plate 314 can include a terminal portion (e.g., an end of the first body 326) 380 on which the first inner surface 378 is positioned. As shown in FIG. 3B, the terminal portion 380 extends axially away from the first primary spring member 312 toward the cover 202. Further, in such examples, the primary guide surface associated with the damper 304 is positioned radially outward relative to the second segment 340. As shown in FIG. 3A, the first inner surface 378 of the first plate 314 is positioned radially outward relative to the second segment 340. Further still, in such examples, the disc member 306 includes a second centering surface 382 positioned on the second segment 340 of the first primary tab 330, which can interact with the terminal portion 380 of the first plate 314. The second centering surface 382 includes and/or corresponds to an outer surface (e.g., an outer circumferential surface) defined by the second segment 340 but not the first segment 338. In particular, in such examples, the second segment 340 or the second centering surface 382 thereon is configured to slide against the terminal portion 380 of the first plate 314 or the first guide surface 378 thereon to provide radial guidance to the disc member 306. Thus, the first guide surface 378 of the first plate 314 and the second centering surface 382, together, can be advantageously used to center the disc member 306 during clutch operation, similar to the first guide surface 342 of the second plate 316 and the first centering surface 372, which will be discussed in greater detail below in connection with FIGS. 7-9.

In the illustrated example of FIG. 3B, the first centering surface 372 faces the first annular portion 344 or the first guide surface 342 of the second plate 316. That is, the first centering surface 372 faces radially inward relative to the first axis 210. On the other hand, the second centering surface 382 faces the terminal portion 380 or the first guide surface 378 of the first plate 314. That is, the second centering surface 382 faces radially outward relative to the first axis 210.

Additionally, in some examples, the first plate 314 includes a first example abutment 384, which can facilitate changing the state of the first primary spring member 312. In such examples, the first cavity surface 374 can be shaped to the form and/or define the first abutment 384. In particular, the first abutment 384 is configured to engage an end of the first primary spring member 312 or a seat associated therewith. Further, in some examples, the first plate 314 is provided with multiple abutments 384.

FIGS. 4-9 are detailed views of the vehicle torque converter assembly 301 and show example implementations thereof. In particular, the damper 304 and part of the clutch 302 (e.g., the disc member 306) are shown in the illustrated examples of FIGS. 4-9. However, the piston 308 is not shown in the illustrated examples of FIGS. 4-9, for clarity.

Figure 4:
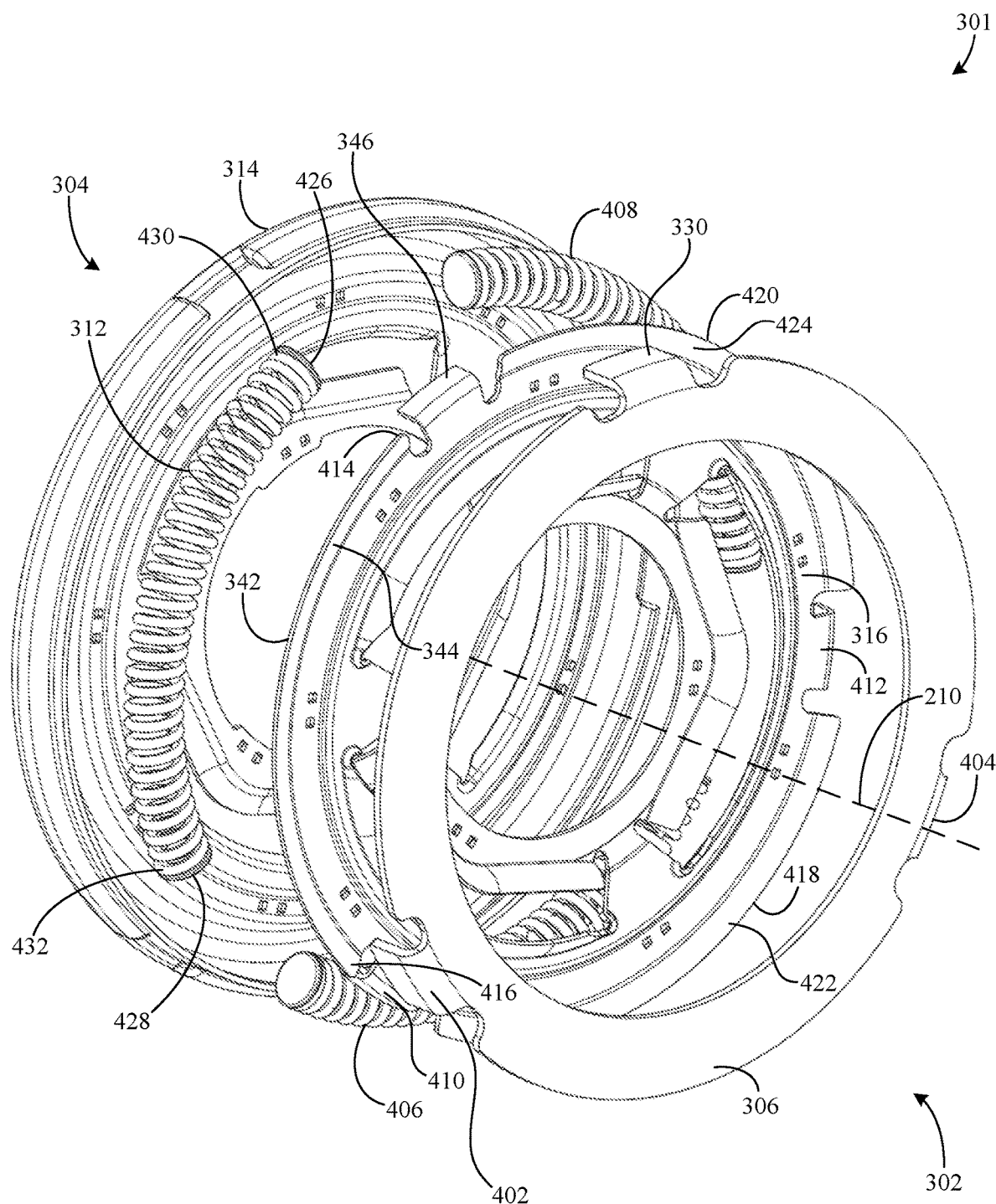
FIGS. 4-9 are detailed views of the vehicle torque converter assembly of FIG. 3A and show example implementations thereof.

Turning in detail to the illustrated example of FIG. 4, an exploded view of the damper 304 is shown in which each of the disc member 306 and the first plate 314 is substantially separated from the second plate 316. As shown in FIG. 4, the first primary tab 330 is discontinuous. That is, the first primary tab 330 extends only partially around the first axis 210. In some examples, the disc member 306 includes one or more other primary tabs in addition or alternatively to the first primary tab 330. For example, the disc member 306 shown in FIG. 4 includes the first primary tab 330, a second primary tab 402, and a third primary tab 404, which can be radially distributed relative to the first axis 210. In the illustrated example of FIG. 4, the first primary tab 330 is angularly spaced from the second primary tab 402 and/or the third primary tab 404. Further, in some examples, the damper 304 also includes one or more other primary spring members in addition or alternatively to the first primary spring member 312. For example, the damper 304 shown in FIG. 4 includes the first primary spring member 312, a second primary spring member 406, and a third primary spring member 408, which can be radially distributed relative to the first axis 210. In such examples, when the clutch 302 and the damper 304 are assembled, the first primary tab 330 is operatively interposed between the first and third primary spring members 312, 408, the second primary tab 402 is operatively interposed between the first and second primary spring members 312, 406, and the third primary tab 404 is interposed between second and third primary spring members 406, 408.

In some examples, each of the primary tab(s) 330, 402, 404 of the disc member 306 is configured to drive two of the primary spring members 312, 406, 408. For example, in operation, the first primary tab 330 drives the first primary spring member 312 and the third primary spring member 408. In such examples, rotation of the first primary tab 330 relative to the second plate 316 about the first axis 210 compresses and decompresses the first and third spring members 312, 408. Additionally, in some examples, each of the primary spring(s) 312, 406, 408 is provided with a relatively small spring therein, which further improves damper performance. For example, a relatively small compression spring (e.g., a coil spring), which is smaller compared to the first primary spring 312, can extend through a central portion of the first primary spring 312, for example, from a first end of the first primary spring 312 to a second end of the first primary spring 312 opposite to the first end.

In some examples, the second plate 316 includes one or more other auxiliary tabs in addition or alternatively to the first auxiliary tab 346. For example, the second plate 316 shown in FIG. 4 includes the first auxiliary tab 346, a second auxiliary tab 410, and a third auxiliary tab 412, which can be radially distributed relative to the first axis 210. In such examples, when the damper 304 is assembled, the first auxiliary tab 346 is operatively interposed between the first and third primary spring members 312, 408, the second auxiliary tab 410 is operatively interposed between the first and second primary spring members 312, 406, and the third auxiliary tab 412 is interposed between the second and third primary spring members 406, 408.

In the illustrated example of FIG. 4, the first annular portion 344 of the second plate 316 is positioned proximate to the first auxiliary tab 346 and/or the second auxiliary tab 410 of the second plate 316. In some examples, a first end 414 of the first annular portion 344 is adjacent the first auxiliary tab 346, and a second end 416 of the first annular portion 344 is adjacent the second auxiliary tab 410. The first and second ends 414, 416 are positioned on the first annular portion 344 opposite relative to each other and are sometimes referred to as opposite ends 414, 416 of the first annular portion 344. Further, as shown in FIG. 4, the first annular portion 344 extends from the first auxiliary tab 346 to the second auxiliary tab 410 to provide the first guide surface 342 of the second plate 316 for guiding the second tab segment 340. Accordingly, the first guide surface 342 of FIG. 4 is discontinuous around the first axis 210. However, in some examples, the first annular portion 344 can be configured such that the first guide surface 342 of the second plate 316 is substantially continuous around the first axis 210.

In some examples, the second plate 316 includes one or more other guide surfaces in addition or alternatively to the first guide surface 342. For example, the second plate 316 of FIG. 4 includes the first guide surface 342, a second guide surface 418, and a third guide surface 420, each of which can slide against the second segment 340 to provide the radial guidance to the disc member 306. Additionally, in such examples, the second plate 316 includes a second example annular portion 422 on which the second guide surface 418 is positioned and a third example annular portion 424 on which the third guide surface 420 is positioned.

In some examples, to facilitate spring compression and decompression, the damper 304 of FIG. 4 also includes one or more seats (e.g., spring seats). For example, the damper 304 of FIG. 4 can include a first seat (e.g., a spring seat) 426 and a second seat (e.g., a spring seat) 428 between which the first primary spring member 312 is positioned. The first and second seats 426, 428 are sometimes referred to as a first pair of seats. The first and second seats 426, 428 are coupled to respective first and second ends (e.g., opposite ends) 430, 432 of the first primary spring member 312. In such examples, the first seat 426 of FIG. 4 can be interposed between and/or pressed between (a) the first end 430 of the first primary spring member 312 and (b) the first segment 338 of the first primary tab 330 and/or the first auxiliary tab 346. Further, in some examples, in response to the first segment 338 or the first auxiliary tab 346 applying a force to the first seat 426, the first seat 426 distributes the force on the first end 430 of the first primary spring member 312. Conversely, in such examples, in response to the first end 430 of the first primary spring member 312 applying a spring force to the first seat 426, the first seat 426 distributes the spring force on the first segment 338 and/or the first auxiliary tab 346.

Similarly, the second seat 428 can be interposed between and/or pressed between (a) the second end 432 of the first primary spring member 312 and (b) the second primary tab 402 of the disc member 306 and/or the second auxiliary tab 410 of the second plate 316. In some examples, in response to the second primary tab 402 or the second auxiliary tab 410 applying a force to the second seat 428, the second seat 428 distributes the force on the second end 432 of the first primary spring member 312. Conversely, in such examples, in response to the second end 432 of the first primary spring member 312 applying a spring force to the second seat 428, the second seat 428 distributes the spring force on the second primary tab 402 and/or the second auxiliary tab 410.

In some examples, the state of the first primary spring member 312 changes when first and second seats 426, 428 move toward and/or away from each other along a path (e.g., a curved path). For example, the path can be provided by one or more surfaces of the damper plate(s) 314, 316 that define the primary cavity 318 such as the first cavity surface 374 and/or the second cavity surface 376 previously described. Although FIG. 4 depicts the first pair of seats 426, 428, in some examples, the damper 304 of FIG. 4 is implemented differently, for example, using one or more other pairs of seats similar to the first pair of seats 426, 428. For example, the damper 304 may include a second pair of seats between which the second primary spring member 406 is positioned and a third pair of seats between which the third primary spring member 408 is positioned. Accordingly, although FIG. 4 depicts aspects in connection with the first pair of seats 426, 428, in some examples, such aspects likewise apply to the other pair(s) of seats of the damper 304.

Figure 5:
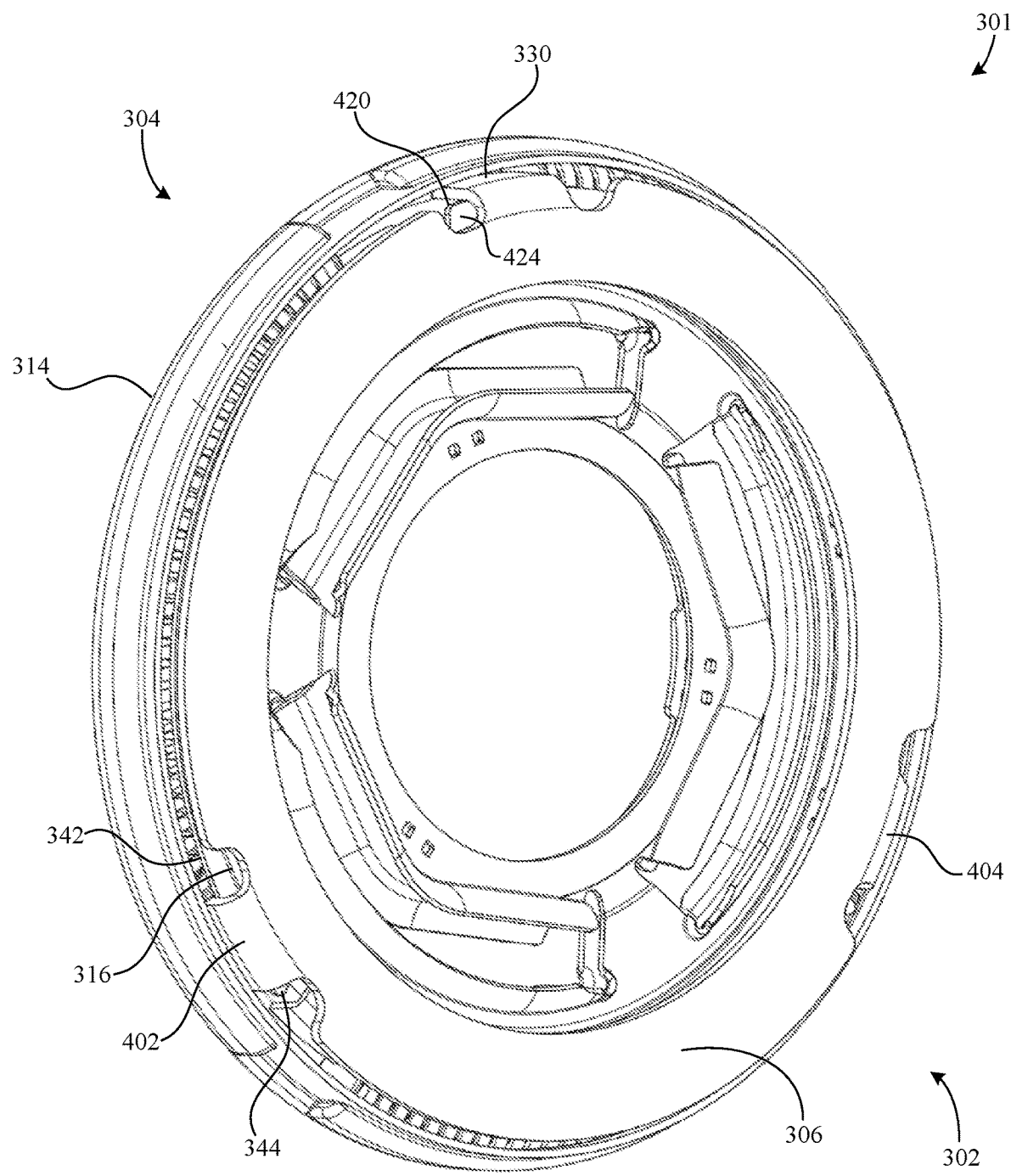

Turning in detail to the illustrated example of FIG. 5, an assembled view of the damper 304 is shown in which the disc member 306, the first plate 314, and the second plate 316 are assembled. In some examples, each of the primary tab(s) 330, 402, 404 shown in FIG. 5 is provided with the aforementioned second segment 340 that is configured to engage (e.g., slidably engage) a respective one of the guide surface(s) 342, 418, 420 of the second plate 316. As shown in FIG. 5, the first primary tab 330 (or the second segment 340 thereof) is directly contacting the third annular portion 424 of the second plate 316, and the second primary tab 402 (or the second segment 340 thereof) is directly contacting the first annular portion 344 of the second plate 316.

Figure 6:
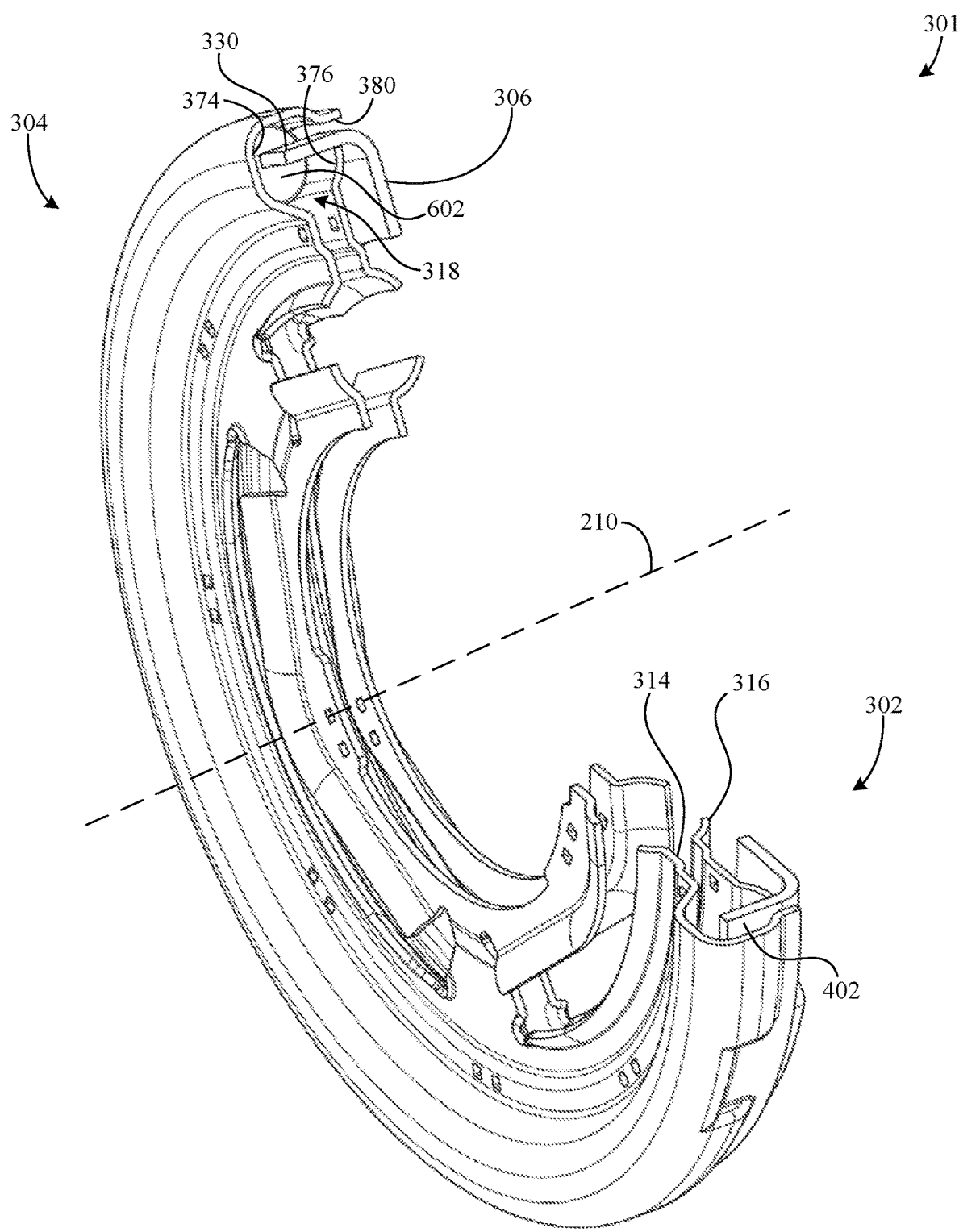

Turning in detail to the illustrated example of FIG. 6, a partial cross-sectional view of the damper 304 is shown in which the disc member 306, the first plate 314, and the second plate 316 are assembled. In some examples, the first segment 338 of the first primary tab 330 is engaged with an example seat (e.g., a spring seat) 602 of the damper 304 configured to distribute a force on a primary spring member 312, 406, 408. In such examples, the first cavity surface 374 of the first plate 314 and the second cavity surface 376 of the second plate 316, together, are configured to guide movement of the spring seat 602 (and/or one or more other spring seats) through the primary cavity 318. In the illustrated example of FIG. 6, the terminal portion 380 of the first plate 314 is positioned at a radius relative to the first axis 210 that is greater than a different radius relative to the first axis 210 at which the primary tab(s) 330, 402, 404 is/are positioned.

Figure 7:
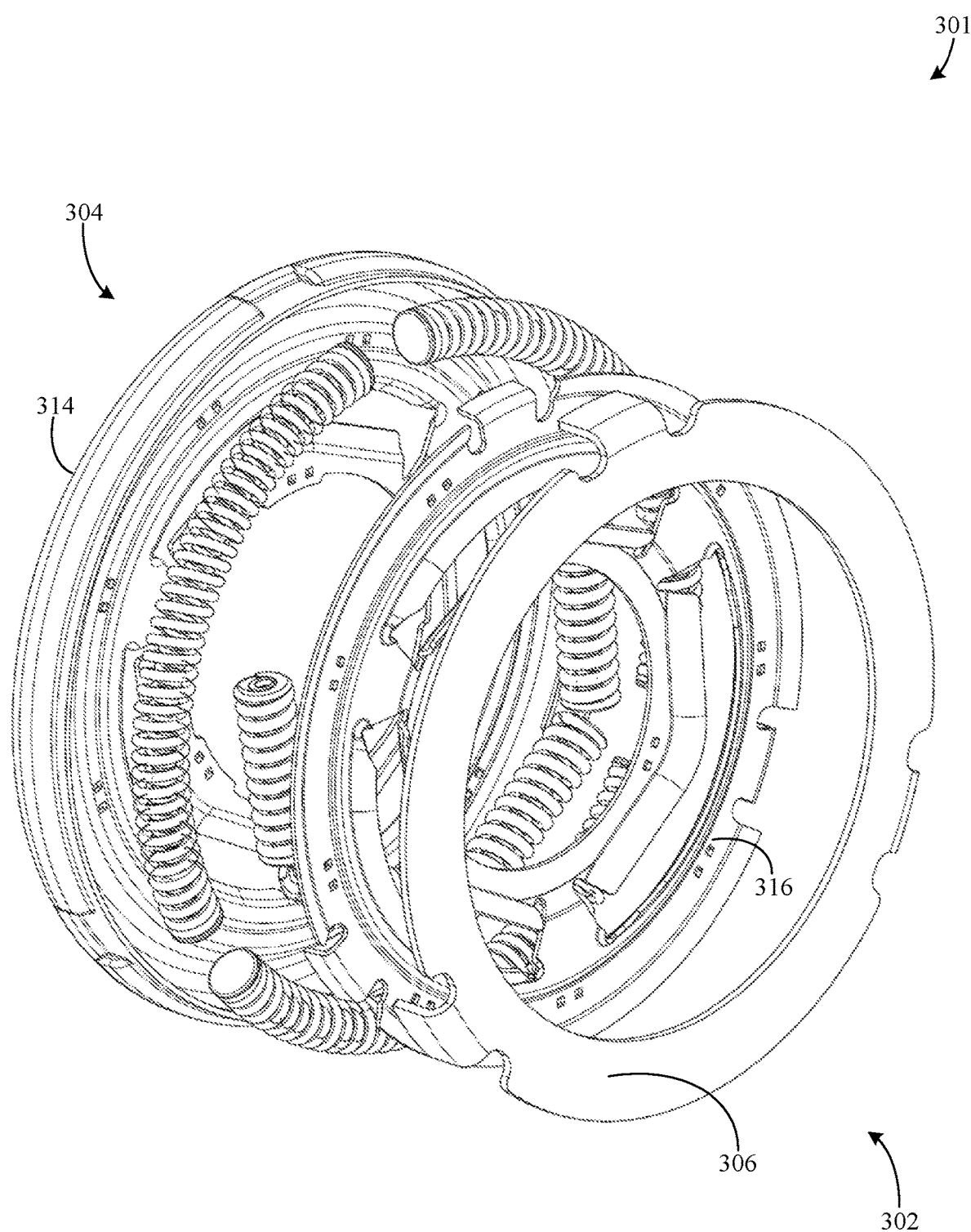

Turning in detail to the illustrated example of FIG. 7, another exploded view of the damper 304 is shown in which each of the disc member 306 and the first plate 314 is substantially separated from the second plate 316.

Figure 8:
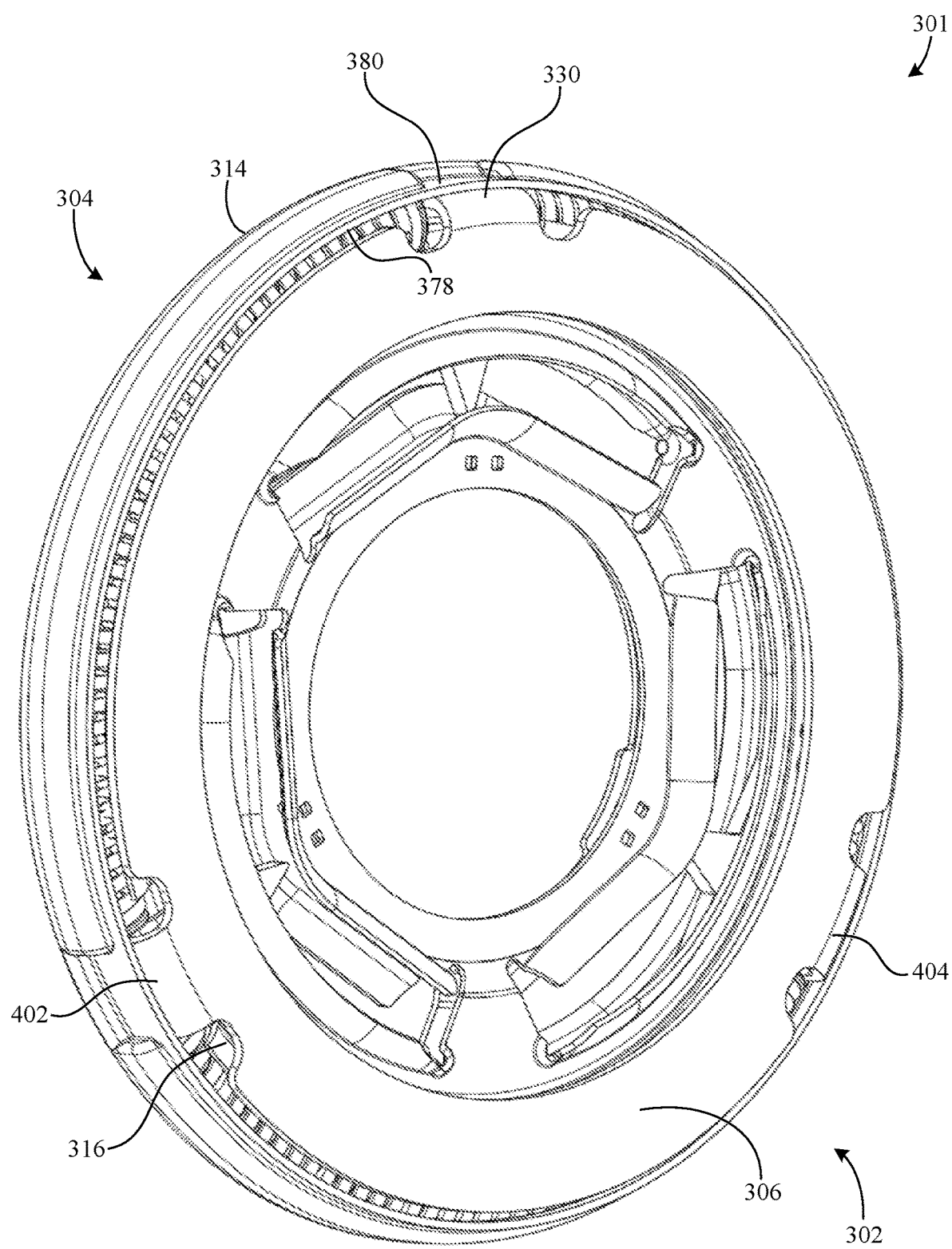

Turning in detail to the illustrated example of FIG. 8, an assembled view of the damper 304 is shown in which the disc member 306, the first plate 314, and the second plate 316 are assembled. In some examples, each of the primary tab(s) 330, 402, 404 shown in FIG. 8 is provided with the aforementioned second segment 340 that is configured to engage (e.g., slidably engage) the first terminal portion 380 of the first plate 314 or the first guide surface 378 of the first plate 314. In the illustrated example of FIG. 8, the first guide surface 378 of the first plate 314 is substantially continuous around the first axis 210.

Figure 9:
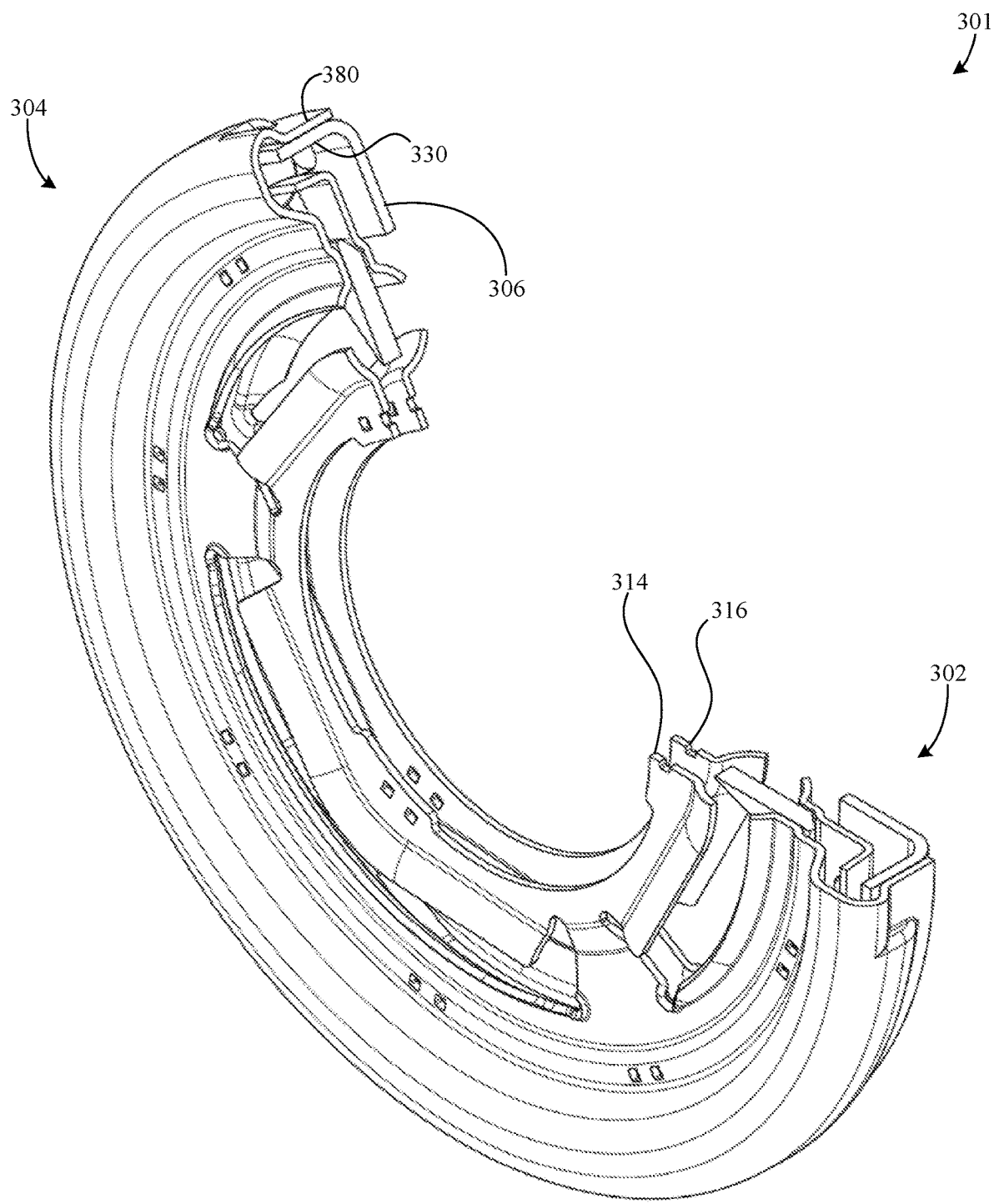

Turning in detail to the illustrated example of FIG. 9, a partial cross-sectional view of the damper 304 is shown in which the disc member 306, the first plate 314, and the second plate 316 are assembled. The first guide surface 378 of the first plate 314 and the first primary tab 330 of the disc member 306 are shown in this example. As shown in FIG. 9, the first primary tab 330 is positioned radially inward relative to the terminal portion 380 of the first plate 314.

Figure 10:
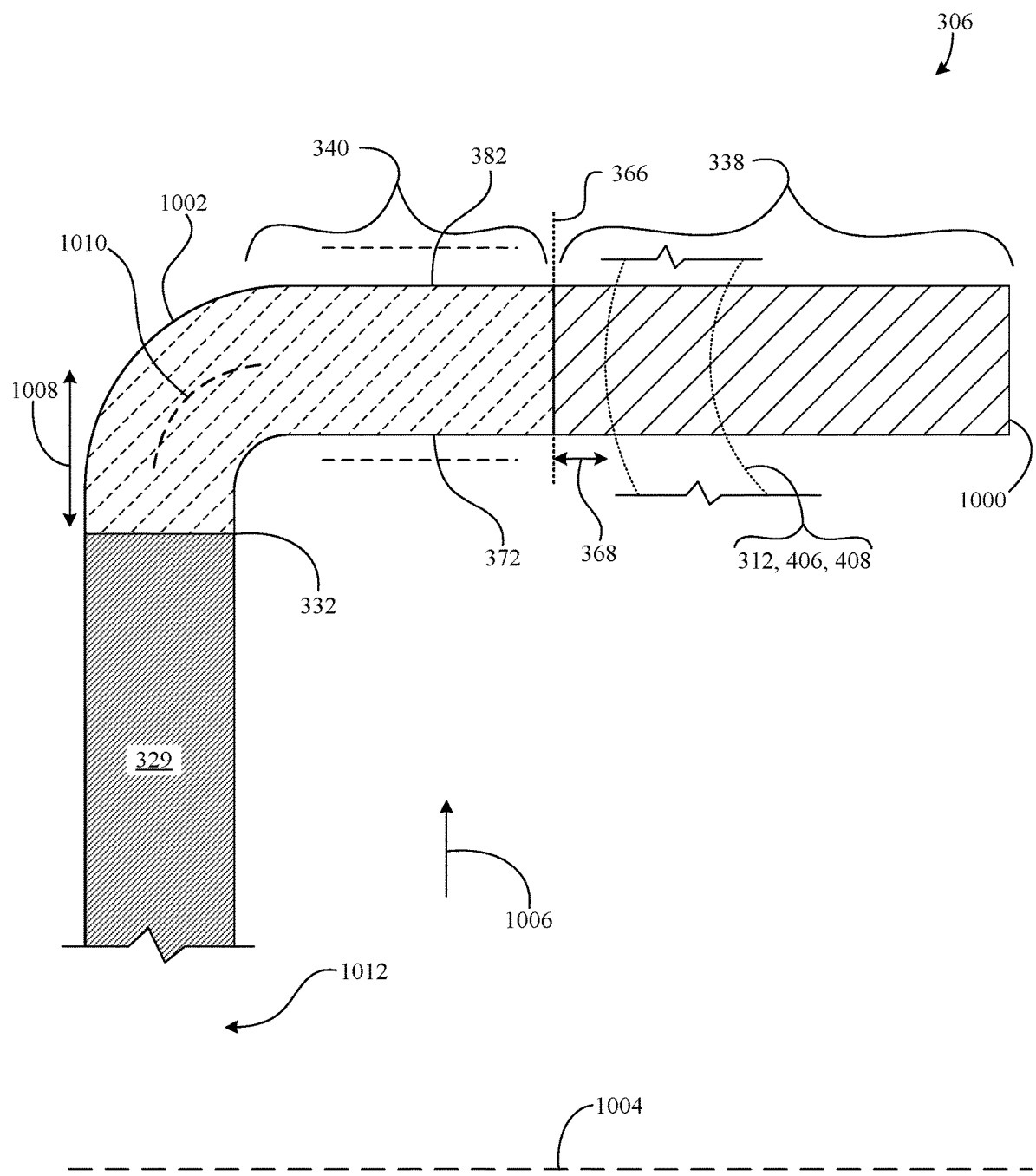
FIG. 10 is a cross-sectional view of an example disc member and shows a primary tab thereof in accordance with the teachings of this disclosure.

FIG. 10 is a cross-sectional view of the disc member 306 and shows a primary tab 1000 thereof. The primary tab 1000 of FIG. 10 can correspond to and/or be used to implemented one or more (e.g., all) of the first primary tab 330, the second primary tab 402, and/or the third primary tab 404 previously described. According to the illustrated example of FIG. 10, the primary tab 1000 is positioned on the third body 329 at or adjacent to the distal portion 332 of the disc member 306. In some examples, the distal portion 332 of the disc member 306 can include an end (e.g., an outer radial end) of the third body 329, as previously described. Additionally, in some examples, the primary tab 1000 is provided with the first segment 338, the second segment 340, and the interface 366 of the first and second segments 338, 340. In such examples, the first segment 338 of the primary tab 1000 can be configured to remain in contact with a primary spring member 312, 406, 408 or an associated seat 426, 428 for torque transfer.

Figure 19:
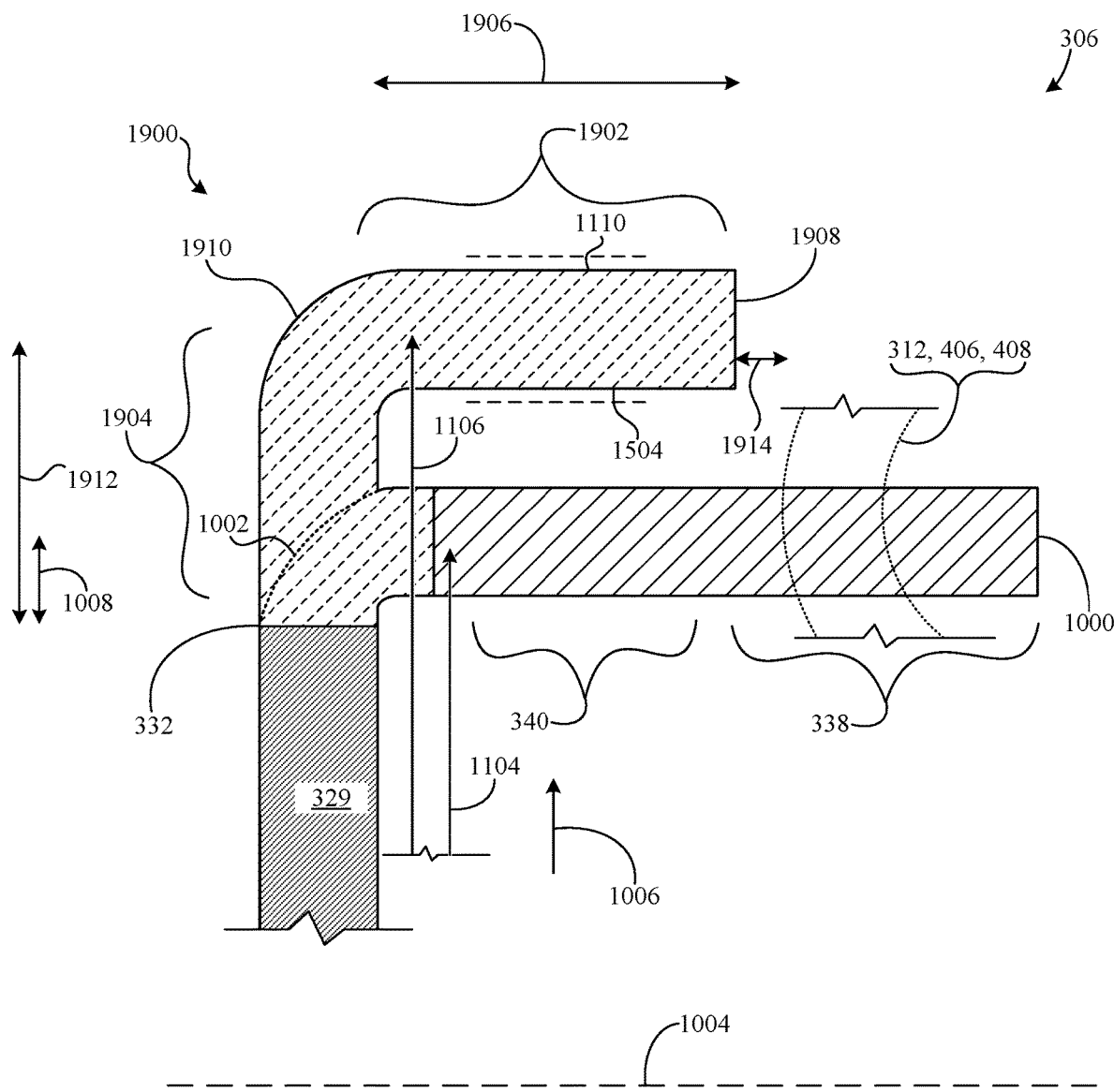
FIG. 19 is a cross-sectional view of an example disc member and shows an extension thereof in accordance with the teachings of this disclosure.

In some examples, the disc member 306 includes a first preformed bend 1002 positioned at or adjacent the distal portion 332 of the disc member 306. The first preformed bend 1002 of FIG. 10 can form at least part of the second segment 340 of the primary tab 1000 and/or at least part of the third body 329. In the illustrated example of FIG. 10, the first preformed bend 1002 curves away from the distal portion 332 of the disc member 306 radially outward relative to a second axis 1004 of the disc member. The second axis 1004 of FIG. 10 can correspond to the first axis 210 previously described. In particular, the first preformed bend 1002 of the disc member 306 extends away from the distal portion 332 in a radially outward direction 1006 across a first radial distance 1008. In FIG. 19, each of the first and second segments 338, 340 of the primary tab 1000 can be spaced from the distal portion 332 of the disc member 306 by the first radial distance 1008.

In some examples, to ensure the second segment 340 of the primary tab 1000 engages a desired guide surface associated with the damper 304, one or more parameters and/or one or more dimensions associated with the disc member 306 can be particularly preconfigured. For example, the disc member 306 can be produced such that a bend radius 1010 of the first preformed bend 1002 is relatively small to provide a relatively short first radial distance 1008, which facilitates the engagement of the first centering surface 372 and the first guide surface 342 of the second plate 316. On the other hand, in another example, the disc member 306 can be produced such that the bend radius 1010 of the first preformed bend 1002 is relatively large to provide a relatively long first radial distance 1008, which facilitates the engagement of the second centering surface 382 and the first guide surface 378 of the first plate 314. Accordingly, the radial distance 1008 of FIG. 10 can be expanded or contracted by particularly sizing and/or shaping the third body 329 and/or the primary tab 1000 to provide a desired engagement scheme.

In the illustrated example of FIG. 10, the primary tab 1000 is provided with the first centering surface 372 and the second centering surface 382, each of which is positioned on the second segment 340 but not the first segment 338. In some examples, each of the first centering surface 372, the second centering surface 382, and/or, more generally, the second segment 340 of the primary tab 1000 is cylindrically-shaped. Additionally, in some examples, the disc member 306 of FIG. 10 can be provided with an aperture 1012 centrally positioned on the third body 329. In the illustrated example of FIG. 10, the aperture 1012 extends entirely through the third body 329 of the disc member 306.

In the illustrated example of FIG. 10, the primary tab 1000 can be configured such that, when the disc member 306 is assembled with the damper 304, the interface 366 of the first and second segments 338, 340 is spaced by the axial distance 368 from a primary spring member 312, 406, 408. In some examples, the axial distance 368 is substantially maintained during clutch operation, for example, such that the second segment 340 of the primary tab 1000 does not interfere with and/or does not contact the primary spring member(s) 312, 406, 408.

In some examples, the second segment 340 is discontinuous around the second axis 1004 and includes two or more members. Alternatively, in some examples, the second segment 340 is continuous around the second axis 1004 and includes a single member. Further, the disc member 306 of FIG. 10 can be a one-piece component such that one or more (e.g., all) of the third body 329, the primary tab 1000, and/or the first preformed bend 1002 are integral.

Figure 11A:
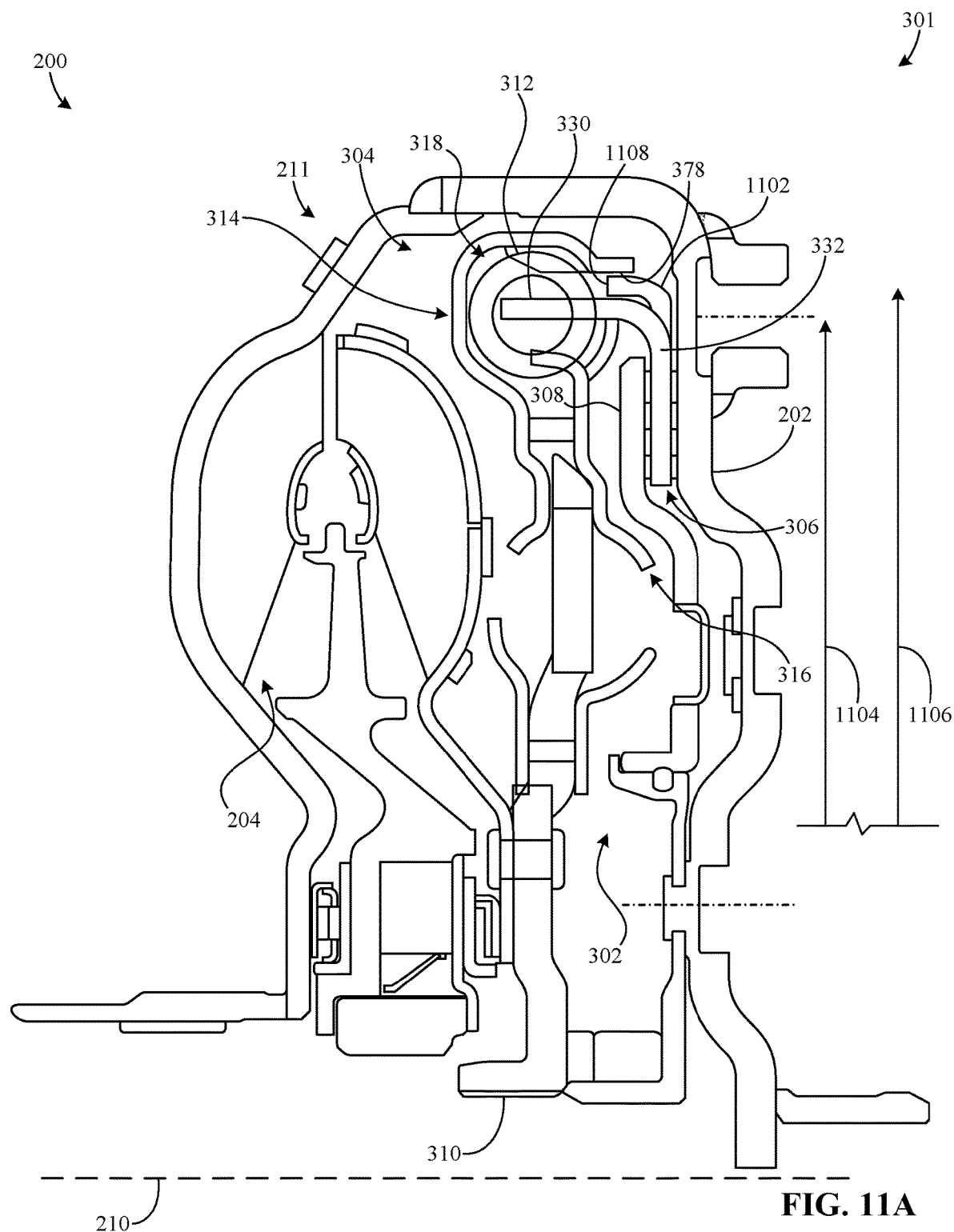
FIG. 11A is another partial cross-sectional view of the example torque converter along line A-A of FIG. 2 and shows a vehicle torque converter assembly in accordance with the teachings of this disclosure.

FIG. 11A is another partial cross-sectional view of the torque converter 200 along line A-A of FIG. 2 and shows the vehicle torque converter assembly 301. In the illustrated example of FIG. 11A, the clutch 302 and the damper 304 of the vehicle torque converter assembly 301 are disposed in the housing 211 of the torque converter 200. Further, the disc member 306, the piston 308, the second hub 310, the first primary spring member 312, the first plate 314, the second plate 316, and the primary cavity 318 are shown in this example. In some examples, the disc member 306 also includes a first extension 1102 that is coupled to the distal portion 332 of the disc member 306, which facilitates centering the disc member 306 relative to the damper plate(s) 314, 316 when the clutch 302 is in operation. In such examples, the first primary tab 330 of FIG. 11A is positioned substantially at a first radius 1104 of the disc member 306, and the first extension 1102 or part thereof is positioned substantially at a second radius 1106 of the disc member 306 different than the first radius 1104. For example, the second radius 1106 of FIG. 11A is greater than the first radius 1104. In the illustrated example of FIG. 11A, the first extension 1102 extends and/or curves away from the first primary tab 330 radially outward relative to the first axis 210. Additionally, the first extension 1102 of FIG. 11A is adjacent the first primary tab 330 and extends axially away from the cover 202 toward the impeller 204 alongside part of the first plate 314. Thus, the first extension 1102 can be a radial extension of the disc member 306, an axial extension of the disc member 306, or a combination thereof.

According to the illustrated example of FIG. 11A, the first extension 1102 is configured to slide against the primary guide surface associated with the damper 304 to provide radial guidance to the disc member 306, which centers the disc member 306 relative to the damper plate(s) 314, 316. In some examples, the primary guide surface associated with the damper 304 is positioned radially outward relative to the first extension 1102. As previously described, the primary guide surface associated with the damper 304 can include, for example, the first inner surface 378 of the first plate 314 (i.e., the first guide surface 378 of the first plate 314). As shown in FIG. 11A, the first inner surface 378 extends alongside a terminal portion (e.g., an end) 1108 of the first extension 1102. Further, the first inner surface 378 of FIG. 11A is positioned radially outward relative to the first extension 1102.

Figure 11B:
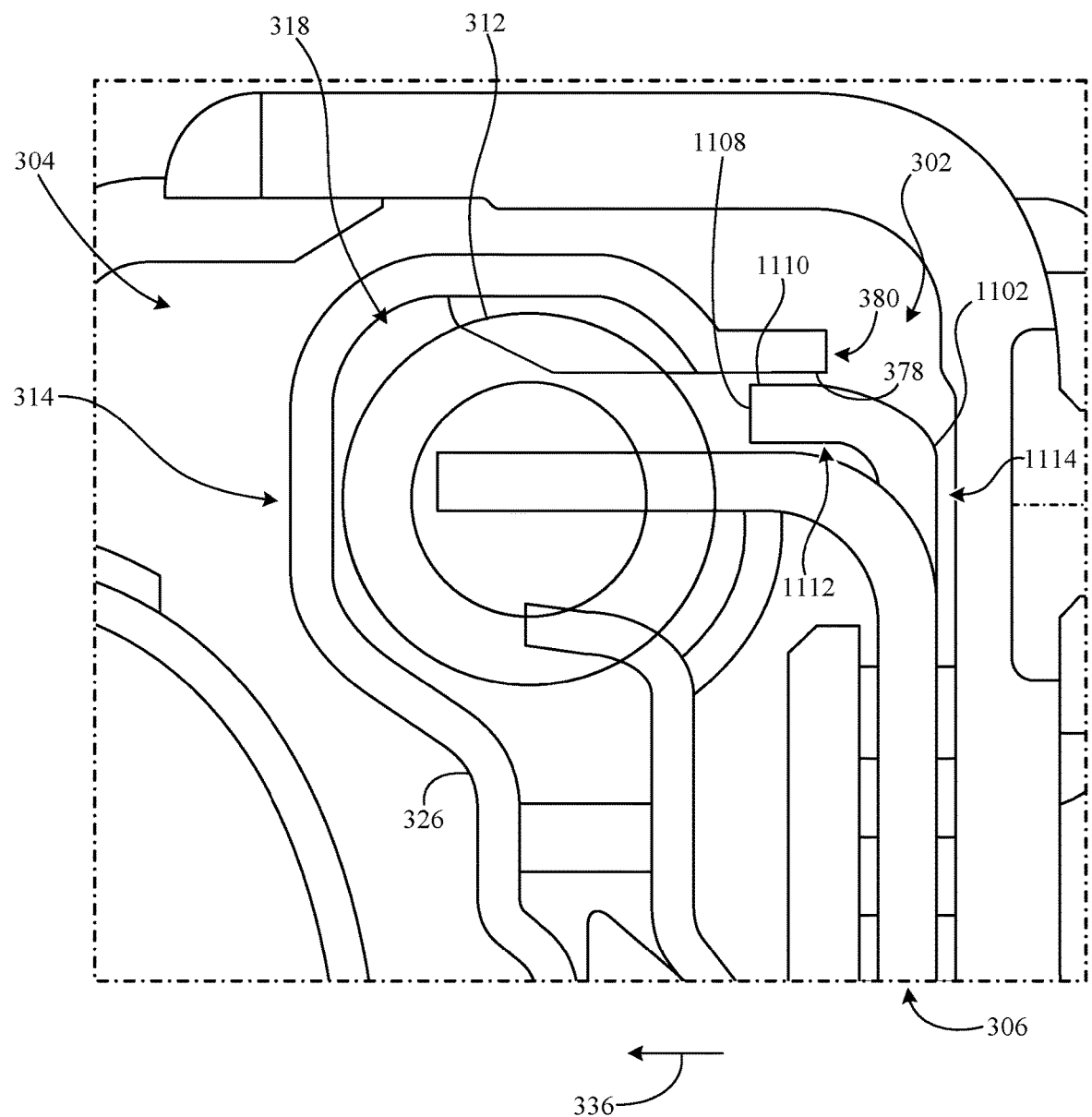
FIG. 11B is an enlarged partial-view of an example clutch and an example damper of the vehicle torque converter assembly of FIG. 11A.

FIG. 11B is an enlarged partial-view of the clutch 302 and the damper 304 of the vehicle torque converter assembly 301 FIG. 11A. According to the illustrated example of FIG. 11B, the terminal portion 380 of the first plate 314 is positioned on the first body 326 adjacent the first extension 1102 or the terminal portion 1108 thereof. In some examples, the terminal portion 380 of the first plate 314 extends axially away from the terminal portion 1108 of the first extension 1102 in the first axial direction 336 toward the primary cavity 318 or the first primary spring member 312 therein, as shown in FIG. 11B. Additionally, in some examples, the disc member 306 includes a third centering surface 1110 positioned on the first extension 1102 substantially at the second radius 1106, which can interact with the terminal portion 380 of the first plate 314. The third centering surface 1110 of FIG. 11B includes and/or corresponds to an outer surface (e.g., an outer circumferential surface) defined by an axial segment 1112 of the first extension 1102 that is connected to a radial segment 1114 of the first extension 1102. In particular, in such examples, the first extension 1102 or the third centering surface 1110 thereon is configured to slide against the terminal portion 380 of the first plate 314 or the first guide surface 378 thereon to provide radial guidance to the disc member 306. In the illustrated example of FIG. 11A, the third centering surface 1110 faces the terminal portion 380 of the first plate 314 or the first guide surface 378 thereon. That is, the third centering surface 1110 faces radially outward relative to the first axis 210.

Figure 12:
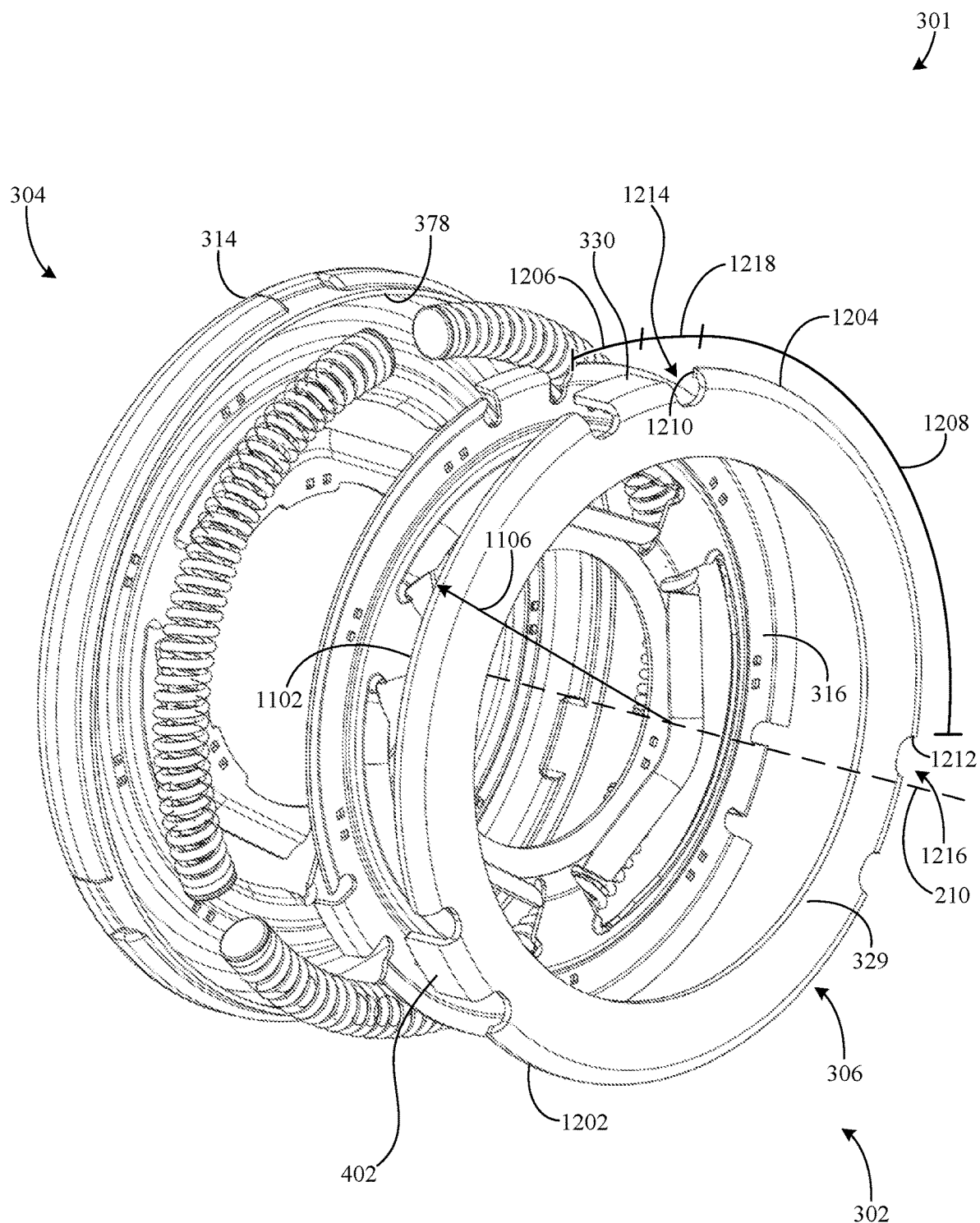
FIGS. 12-14 are detailed views of the vehicle torque converter assembly of FIG. 11A and show example implementations thereof.
Figure 13:
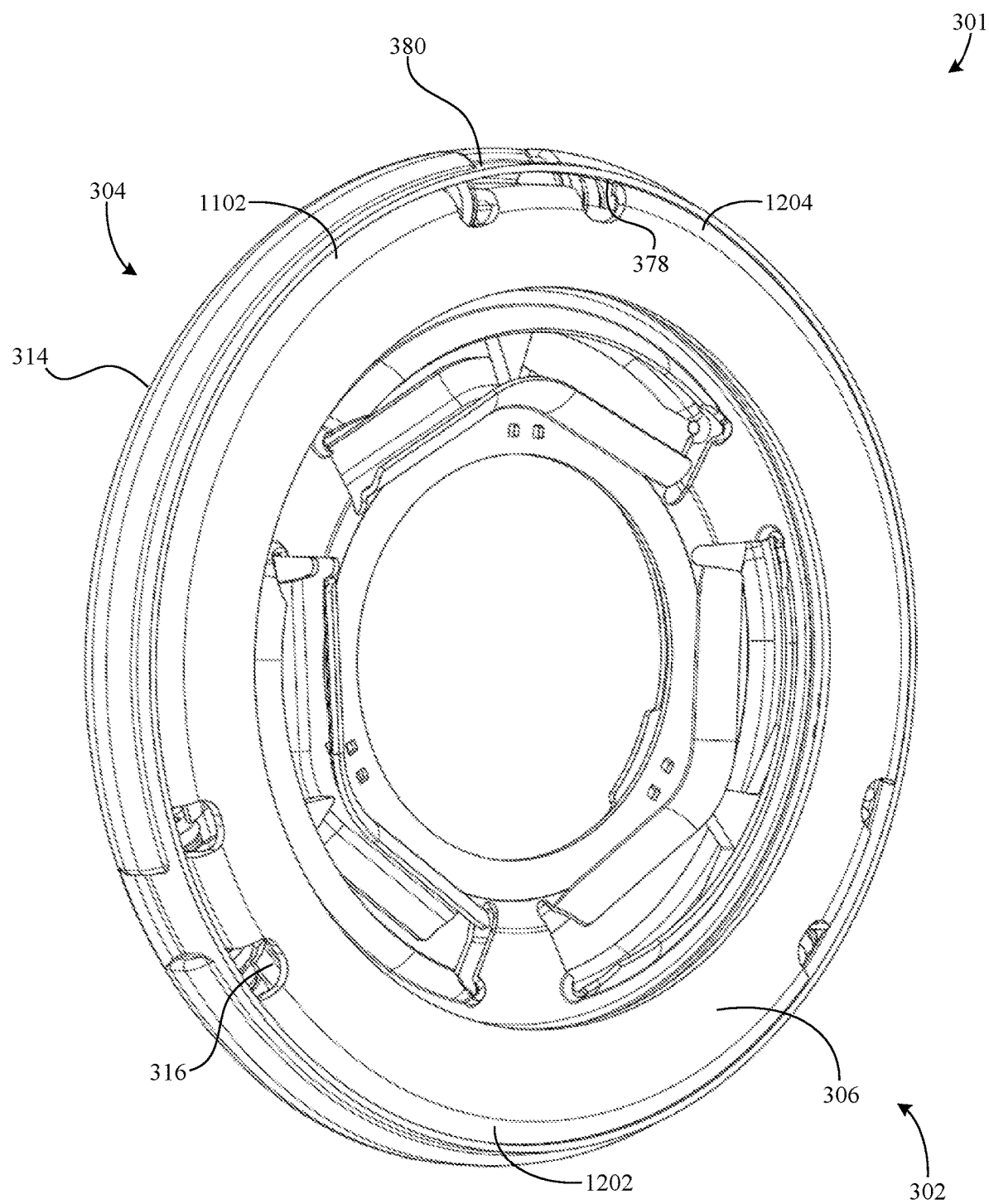
Figure 14:
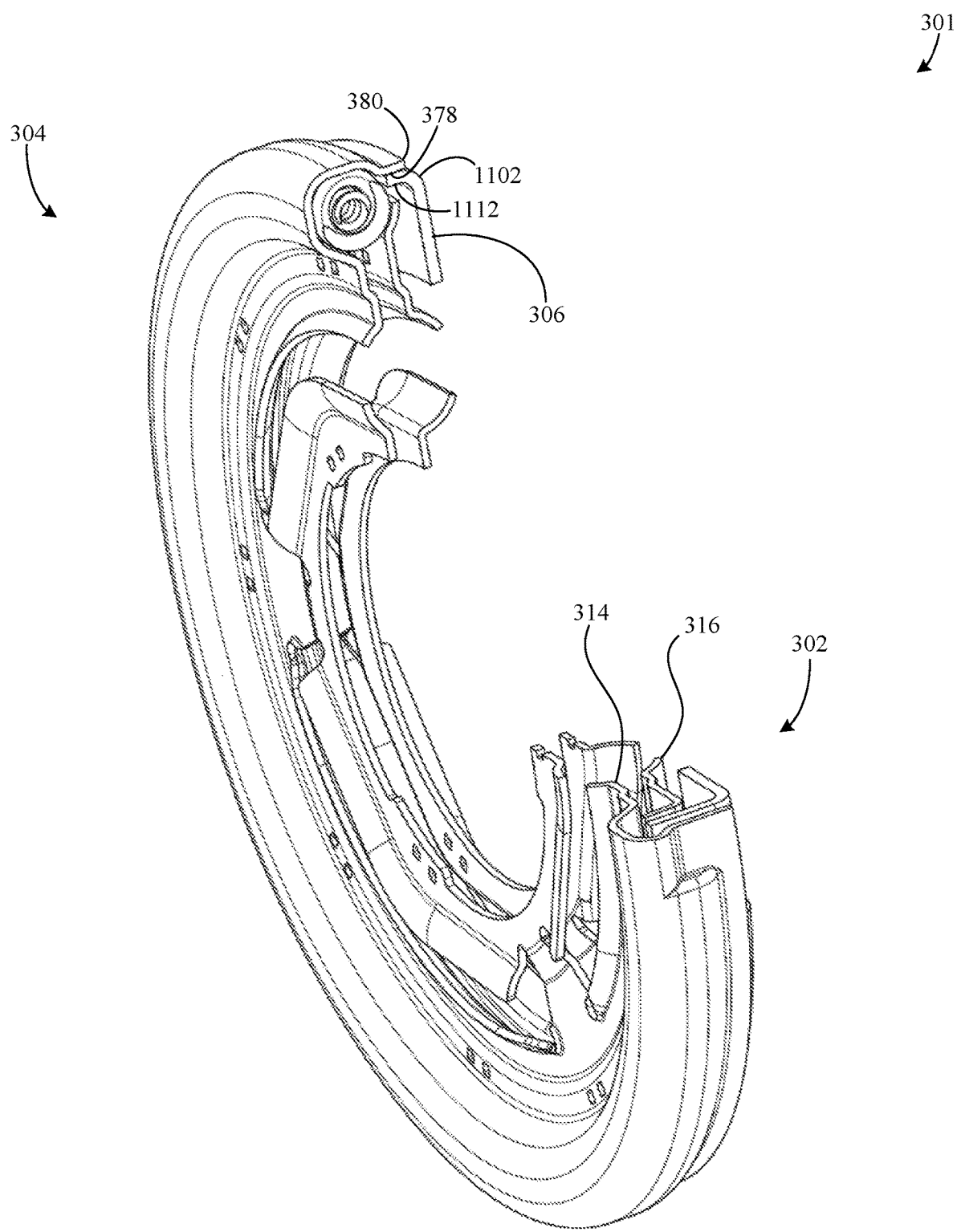

FIGS. 12-14 are detailed views of the vehicle torque converter assembly 301 and show example implementations thereof. In particular, the damper 304 and part of the clutch 302 (e.g., the disc member 306) are shown in the illustrated examples of FIGS. 12-14. However, the piston 308 is not shown in the illustrated examples of FIGS. 12-14, for clarity.

Turning in detail to the illustrated example of FIG. 12, another exploded view of the damper 304 is shown in which each of the disc member 306 and the first plate 314 is substantially separated from the second plate 316. As shown in FIG. 12, the first extension 1102 extends away from the first primary tab 330 along the second radius 1106, for example, toward or to the second primary tab 402. Further, the first extension 1102 of FIG. 12 is discontinuous. That is, the first extension 1102 of FIG. 12 extends only partially around the first axis 210. On the other hand, the first guide surface 378 of the first plate 314 is substantially continuous. In some examples, the disc member 306 includes one or more other extensions in addition or alternatively to the first extension 1102. For example, the disc member 306 shown in FIG. 12 includes the first extension 1102, a second extension 1202, and a third extension 1204, which can be radially distributed relative to the first axis 210.

In the illustrated example of FIG. 12, the first, second, and third primary tabs 330, 402, 404 of the disc member 306 are radially distributed relative to the first axis 210. That is, the first, second, and third primary tabs 330, 402, 404 of FIG. 12 are angularly spaced from each other. In some examples, the first extension 1102 of FIG. 12 extends substantially from the first primary tab 330 to the second primary tab 402. Additionally, in some examples, each of the primary tab(s) 330, 402, 404 has a first arc length 1206, and each of the extension(s) 1102, 1202, 1204 has a second arc length 1208. In such examples, the first arc length 1206 is less than the second arc length 1208, as shown in FIG. 12. In other words, each of the first, second, and third primary tabs 330, 402, 404 of FIG. 12 has an arc length 1206 that is less than an arc length 1208 of (a) the first extension 1102, (b) the second extension 1202, or (c) the third extension 1204.

In some examples, the first primary tab 330, the second primary tab 402, and opposite ends 1210, 1212 of the first extension 1102 define cutouts 1214, 1216 extending through the disc member 306. In the illustrated example of FIG. 12, a first cutout (e.g., an aperture) 1214 is positioned on the third body 329 at a first end 1210 of the first extension 1102, and a second cutout (e.g., an aperture) 1216 is positioned on the third body 329 at a second end 1212 of the first extension 1102 opposite to the first end 1210. Additionally, in such examples, each of the cutouts 1214, 1216 has a third arc length 1218 that is less than the first arc length 1206 and/or the second arc length 1208. In other words, each of the cutouts 1214, 1216 of FIG. 12 has an arc length 1218 that is less than an arc length 1206, 1208 of a primary tab 330, 402, 404 or an extension 1102, 1202, 1204.

Turning in detail to the illustrated example of FIG. 13, an assembled view of the damper 304 is shown in which the disc member 306, the first plate 314, and the second plate 316 are assembled. In some examples, each of the extensions 1102, 1202, 1204 of the disc member 306 is engaged with the terminal portion 380 of the first plate 314 or the first guide surface 378 of the first plate 314.

Turning in detail to the illustrated example of FIG. 14, a partial cross-sectional view of the damper 304 is shown in which the disc member 306, the first plate 314, and the second plate 316 are assembled. The first guide surface 378 of the first plate 314 and the first extension 1102 of the disc member 306 are shown in this example. In the illustrated example of FIG. 14, the axial segment 1112 of the first extension 1102 is positioned radially inward relative to the terminal portion 380 of the first plate 314.

Figure 15:
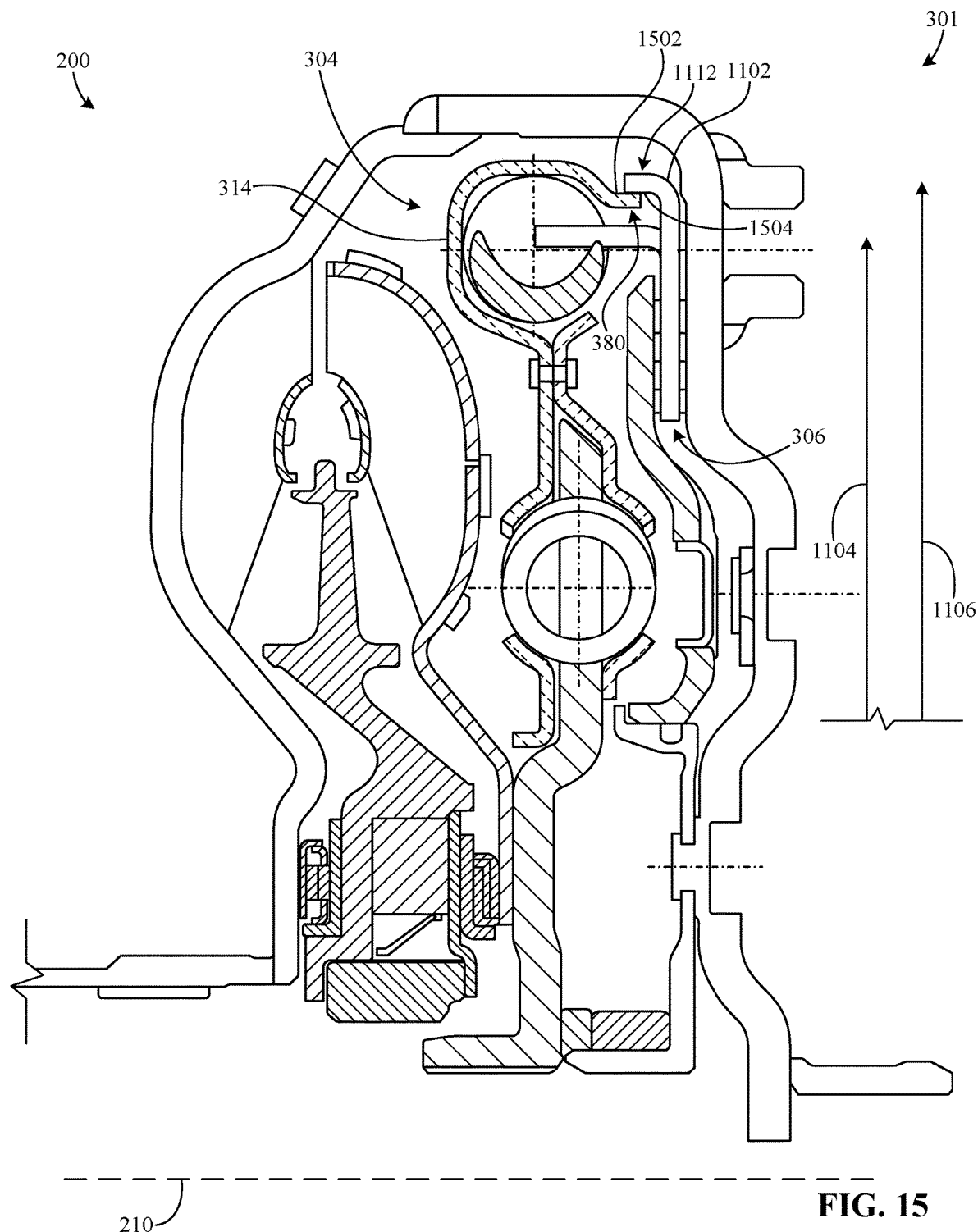
FIG. 15 is another partial cross-sectional view of the example torque converter along line A-A of FIG. 2 and shows a vehicle torque converter assembly in accordance with the teachings of this disclosure.

FIG. 15 is another partial cross-sectional view of the torque converter 200 along line A-A of FIG. 2 and shows the vehicle torque converter assembly 301. In some examples, in addition or alternatively to the first guide surface 378 of the first plate 314, the primary guide surface associated with the damper 304, which facilitates providing the radial guidance to the disc member 306, includes a first outer surface (e.g., an outer circumferential surface of the retainer plate) 1502 of the first plate 314 that extends alongside the first extension 1102 of the disc member 306. Accordingly, the first outer surface 1502 of the first plate 314 is sometimes referred to as a second guide surface of the first plate 314. In such examples, the first outer surface 1502 of the first plate 314 is positioned on the terminal portion 380 of the first plate 314. In such examples, the primary guide surface associated with the damper 304 is positioned radially inward relative to the first extension 1102 or part thereof. As shown in FIG. 15, the first outer surface 1502 of the first plate 314 is positioned radially inward relative to the axial segment 1112 of the first extension 1102.

In such examples, the disc member 306 includes a fourth centering surface 1504 positioned on the first extension 1102 substantially at the second radius 1106, which can interact with the terminal portion 380 of the first plate 314. The fourth centering surface 1504 of FIG. 15 includes and/or corresponds to an inner surface (e.g., an inner circumferential surface) defined by the axial segment 1112 of the first extension 1102. In particular, in such examples, the first extension 1102 or the fourth centering surface 1504 thereon is configured to slide against the terminal portion 380 of the first plate 314 or the second guide surface 1502 thereon to provide radial guidance to the disc member 306. Thus, the second guide surface 1502 of the first plate 314 and the fourth centering surface 1504, together, can be advantageously used to center the disc member 306 during clutch operation, similar to the first guide surface 378 of the first plate 314 and the third centering surface 1110. In the illustrated example of FIG. 15, the fourth centering surface 1504 of FIG. 15 faces the terminal portion 380 or the second guide surface 1502 of the first plate 314. That is, the fourth centering surface 1504 of FIG. 15 faces radially inward relative to the first axis 210.

Figure 16:
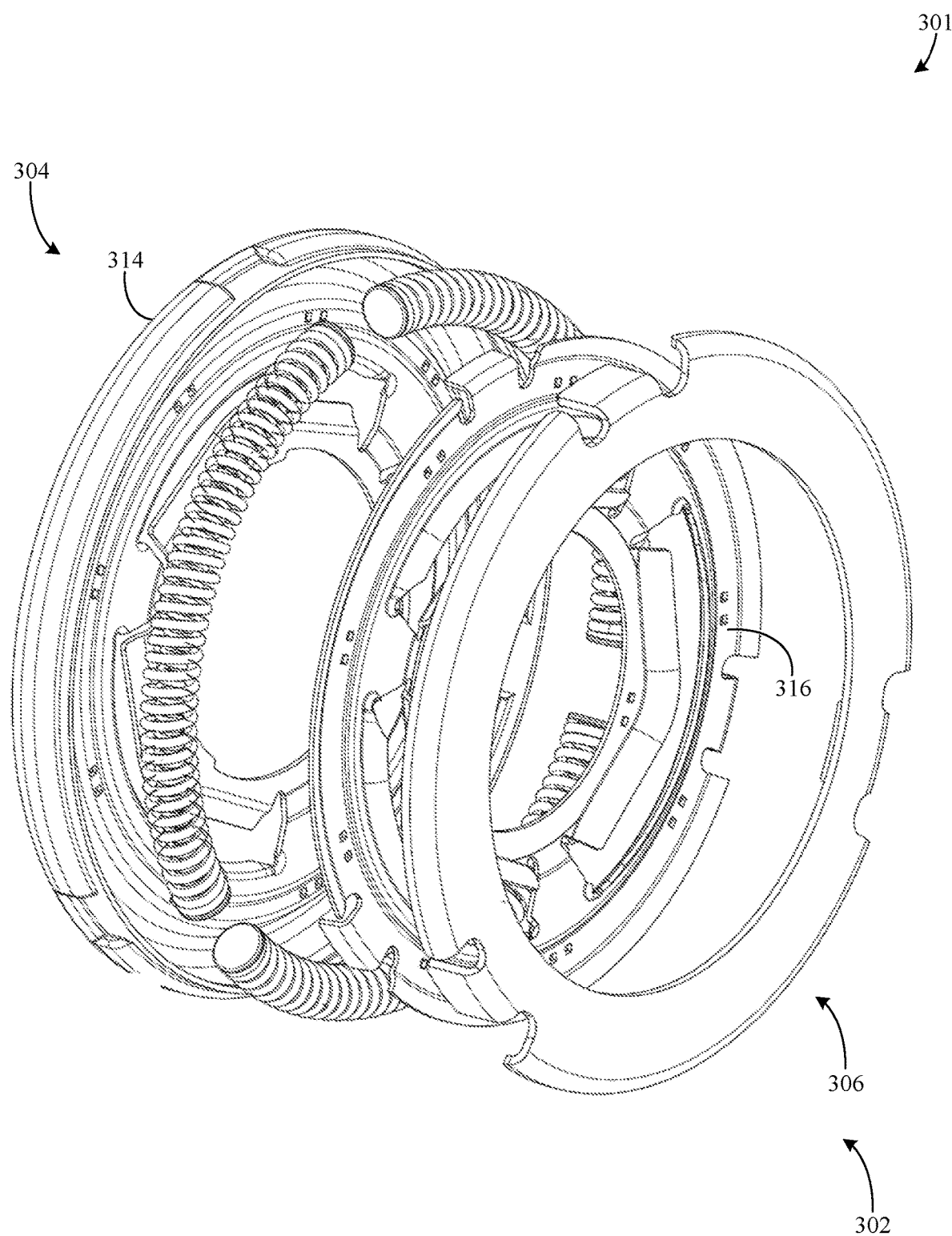
FIGS. 16-18 are detailed views of the vehicle torque converter assembly of FIG. 15 and show example implementations thereof.
Figure 17:
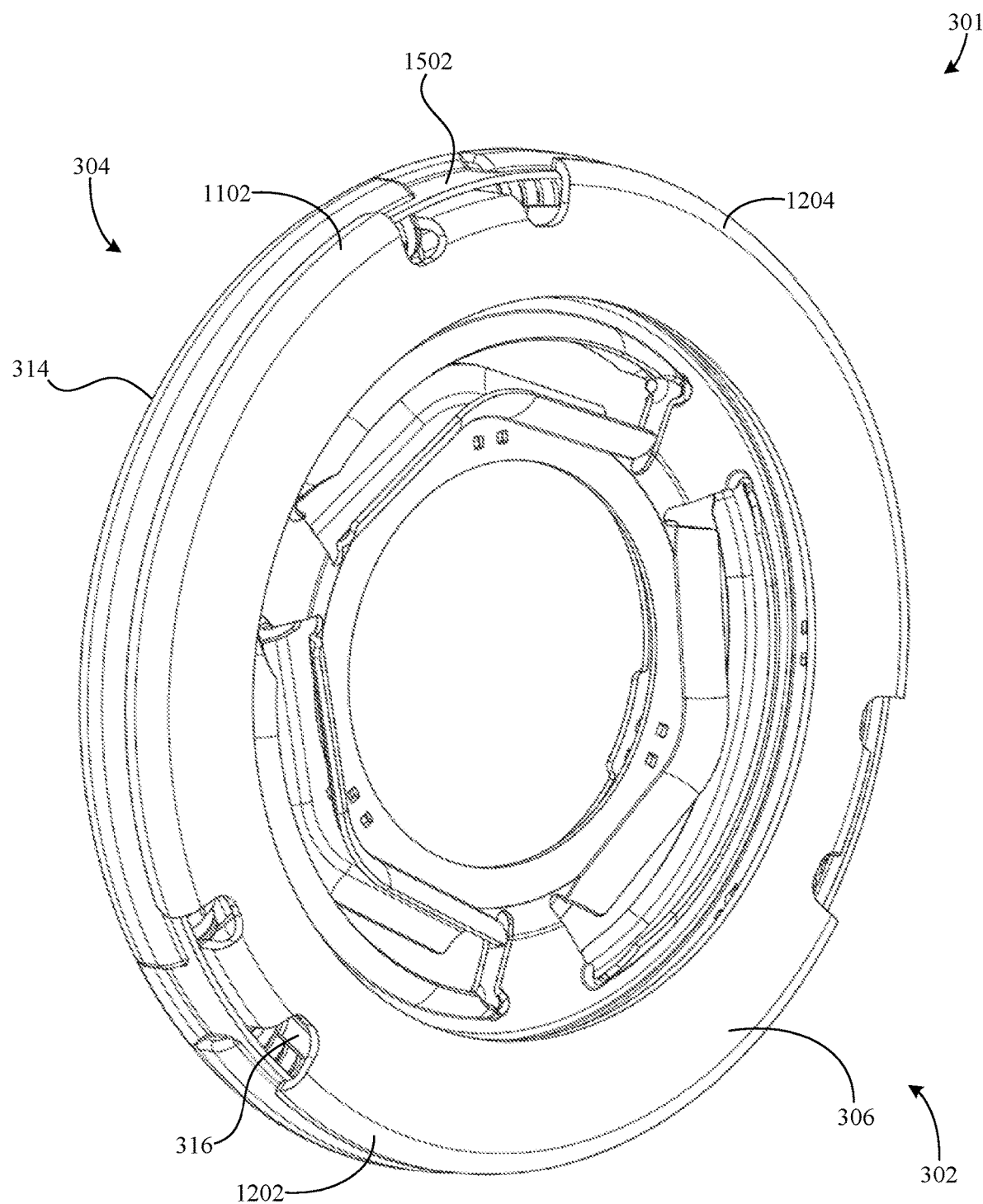
Figure 18:
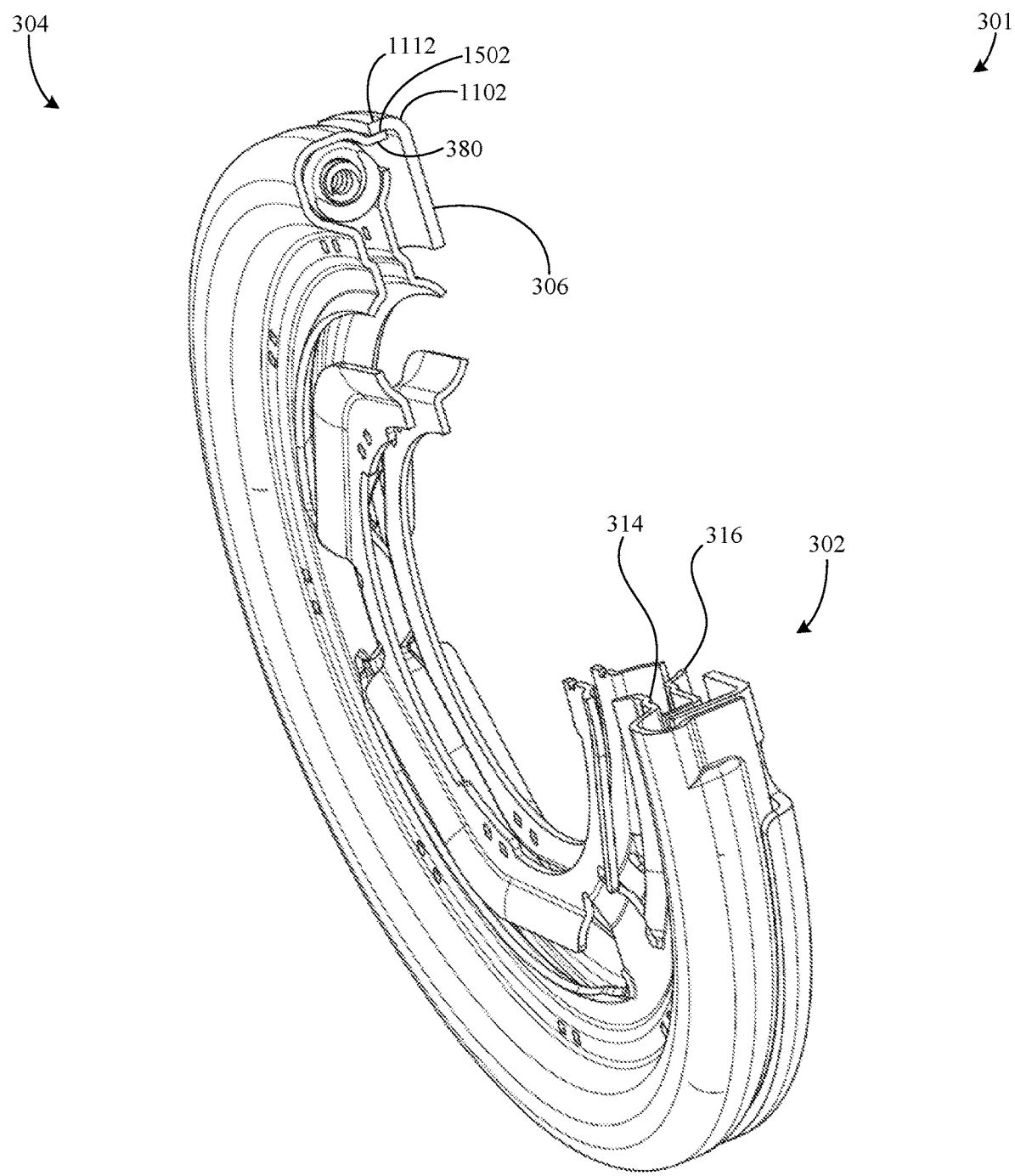

FIGS. 16-18 are detailed views of the vehicle torque converter assembly 301 and show example implementations thereof. In particular, the damper 304 and part of the clutch 302 (e.g., the disc member 306) are shown in the illustrated examples of FIGS. 16-18. However, the piston 308 is not shown in the illustrated examples of FIGS. 16-18, for clarity Turning in detail to the illustrated example of FIG. 16, an exploded view of the damper 304 is shown in which each of the disc member 306 and the first plate 314 is substantially separated from the second plate 316.

Turning in detail to the illustrated example of FIG. 17, an assembled view of the damper 304 is shown in which the disc member 306, the first plate 314, and the second plate 316 are assembled. In some examples, each of the extensions 1102, 1202, 1204 of the disc member 306 is engaged with the terminal portion 380 of the first plate 314 or the second guide surface 1502 of the first plate 314.

Turning in detail to the illustrated example of FIG. 18, a partial cross-sectional view of the damper 304 is shown in which the disc member 306, the first plate 314, and the second plate 316 are assembled. The second guide surface 1502 of the first plate 314 and the first extension 1102 of the disc member 306 are shown in this example. In the illustrated example of FIG. 18, the axial segment 1112 of the first extension 1102 is positioned radially outward relative to the terminal portion 380 of the first plate 314.

FIG. 19 is a cross-sectional view of the disc member 306 and shows a primary extension 1900 thereof. The primary extension 1900 of FIG. 19 can correspond to and/or be used to implemented one or more (e.g., all) of the first extension 1102, the second extension 1202, and/or the third extension 1204 previously described. According to the illustrated example of FIG. 19, the primary extension 1900 includes an axial segment 1902 and a radial segment 1904 connected between the axial segment 1902 and the distal portion 332 of the disc member 306. That is, the radial segment 1904 is coupled with the distal portion 332 of the disc member 306 and extends away from the distal portion 332 in the radially outward direction 1006 and/or curves away from the distal portion 332 toward the axial segment 1902 to couple with the axial segment 1902. On the other hand, the axial segment 1902 of FIG. 19 extends axially away from the radial segment 1904 along the second axis 1004 to define the third centering surface 1110 and/or the fourth centering surface 1504. The axial segment 1902 of FIG. 19 may extend across a certain axial distance 1906 substantially perpendicular to the second axis 1004 and reach an end 1908 of the primary extension 1900. Further, as shown in FIG. 19, the axial segment 1902 is positioned substantially at the second radius 1106, while the primary tab 1000 is positioned substantially at the first radius 1104.

In some examples, the primary tab 1000 of the disc member 306 is provided with the first segment 338 but not the second segment 340. The first segment 338 of the primary tab 1000 can be configured to remain in contact with a primary spring member 312, 406, 408 or an associated seat 426, 428 for torque transfer, as previously described. In such examples, no portion of the primary tab 1000 of FIG. 19 is configured to slide against the primary guide surface associated with the damper 304. However, the primary tab 1000 of FIG. 19 can be provided with the second segment 340. Thus, in some examples, the second segment 340 of the primary tab 1000 and part (e.g., the axial segment 1902) of the primary extension 1900, together, can be configured to slide against a respective guide surface associated with the damper 304 to provide radial guidance to the disc member 306 during clutch operation. For example, the second segment 340 of the primary tab 1000 can slide against the first guide surface 342 of the second plate 316 while the primary extension 1102 or the axial segment 1902 thereof slides against the first guide surface 378 of the first plate 314 (e.g., see FIGS. 11A and 11B).

In some examples, the disc member 306 includes a second preformed bend 1910 positioned adjacent or proximate to the distal portion 332 of the disc member 306 and radially outward relative to the first preformed bend 1002 of FIG. 19. The second preformed bend 1910 can form at least part of the primary extension 1900 and/or at least part of the third body 329. In FIG. 19, the second preformed bend 1910 corresponds to the axial segment 1902 and/or the radial segment 1904 and, in some examples, can serve as an interface of the axial and radial segments 1902, 1904. The axial and radial segments 1902, 1904 can be substantially angled and/or perpendicular relative to each other. Further, the axial segment 1902 of FIG. 19 is spaced from the distal portion 332 of the disc member 306 by a second radial distance 1912 due to a curvature of the second preformed bend 1910 and/or a radial length of the radial segment 1904. As shown in FIG. 19, the second radial distance 1912 is substantially greater than the first radial distance 1008.

In the illustrated example of FIG. 19, the primary extension 1900 is provided with the third centering surface 1110 and the fourth centering surface 1504, each of which is positioned on the axial segment 1902 and/or adjacent the end 1908 of the primary extension 1900. In some examples, each of the third centering surface 1110, the fourth centering surface 1504, and/or, more generally, the axial segment 1902 is cylindrically-shaped.

In some examples, to ensure the primary extension 1900 of the disc member 306 engages a desired guide surface associated with the damper 304, one or more parameters and/or one or more dimensions associated with the disc member 306 can be particularly preconfigured. For example, the disc member 306 can be provided with a relatively short second radial distance 1912, which facilitates the engagement of the third centering surface 1110 and the first guide surface 378 of the first plate 314. On the other hand, in another example, the disc member 306 can be provided with a relatively long second radial distance 1912, which facilitates the engagement of the fourth centering surface 1504 and the second guide surface 1502 of the first plate 314. Accordingly, the second radial distance 1912 of FIG. 19 can be expanded or contracted by particularly sizing and/or shaping the third body 329 and/or the primary extension 1900 to provide a desired engagement scheme.

Further, although FIG. 19 depicts the primary extension 1900 that is positioned radially outward relative to the primary tab 1000, in some examples, the primary extension 1900 and/or the primary tab 1000 is/are implemented differently. For example, the primary extension 1900 can be positioned radially inward relative to the primary tab 1000. In such examples, the second radial distance 1912 is substantially less than the first radial distance 1008. Additionally or alternatively, in such examples, the second radius 1106 at which the primary extension 1900 is positioned is substantially less than the first radius 1104 at which the primary tab 1000 is positioned.

In the illustrated example of FIG. 19, the primary extension 1900 can be configured such that, when the disc member 306 is assembled with the damper 304, the primary extension 1900 or the end 1908 thereof is spaced by another axial distance 1914 from a primary spring member 312, 406, 408. In some examples, such an axial distance 1914 is substantially maintained during clutch operation, for example such that the primary extension 1900 does not interfere with and/or contact the spring primary member(s) 312, 406, 408.

Additionally, in some examples, the disc member 306 of FIG. 19 is a one-piece component such that one or more (e.g., all) of the third body 329, the primary tab 1000, the first preformed bend 1002, the primary extension 1900, the axial segment 1902, the radial segment 1904, and/or the second preformed bend 1910 are integral.

As used herein, the terms "including" and "comprising" (and all forms and tenses thereof) are to be open ended terms. Thus, whenever a claim employs any form of "include" or "comprise" (e.g., comprises, includes, comprising, including, has, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended.

It will be appreciated that the systems, apparatus, and methods disclosed in the foregoing description provide numerous advantages. Examples disclosed herein provide an example disc member of a vehicle torque converter clutch configurable to have one or more features that facilitate centering the disc member with one or more damper plates. Examples disclosed herein improve clutch performance and/or part life associated with one or more components of the vehicle torque converter clutch while reducing part weight and/or related costs.

Although certain example systems, apparatus, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A vehicle torque converter assembly, comprising:
   a torsional vibration damper including a first plate, a second plate connected to a vehicle torque converter output, a first spring member, and a second spring member radially inward of the first spring member, the first spring member and the second spring member each arranged between the first plate and the second plate;
   a flange connected between the second spring member and the vehicle torque converter output, the first plate and the second plate being relatively rotatably coupled to the vehicle torque converter output by the flange, and the flange is arranged in a space between the first plate and the second late; and
   a clutch operatively coupled to the torsional vibration damper, the clutch including:
      a friction disc including a tab coupled to a distal portion of the friction disc and extending axially away from the distal portion, and
      a piston configured to urge the friction disc into engagement with a torque converter cover to transfer torque from the torque converter cover to the torsional vibration damper,
   wherein the tab includes (a) a first segment directly contacting the first spring member or a spring seat of the first spring member and (b) a second segment between the first segment and the distal portion of the friction disc, the second segment configured to slide against a guide surface of the second plate to provide radial guidance to the friction disc.

2. The vehicle torque converter assembly of claim 1, wherein an interface of the first and second segments is spaced by an axial distance from the first spring member.

3. The vehicle torque converter assembly of claim 1, wherein the guide surface is positioned radially inward relative to the second segment of the tab and includes an outer circumferential surface of the second plate that extends alongside the second segment.

4. The vehicle torque converter assembly of claim 2, wherein the second plate includes an annular portion on which the guide surface is positioned, and wherein the annular portion curves away from the second segment of the tab to partially define a spring cavity of the torsional vibration damper.

5. The vehicle torque converter assembly of claim 1, wherein the first plate includes a retainer plate partially defining an annular cavity in which the first spring member is positioned.

6. The vehicle torque converter assembly of claim 5, wherein the guide surface is positioned radially outward relative to the second segment of the tab and includes an inner circumferential surface of the retainer plate that extends alongside the second segment.

7. The vehicle torque converter assembly of claim 1, wherein the friction disc includes an extension coupled to the distal portion of the friction disc adjacent the tab, the extension configured to slide against the guide surface of the second plate or a guide surface of a different plate to provide radial guidance to the friction disc.

8. A vehicle torque converter assembly, comprising:
a torsional vibration damper including a plate; and
a clutch including:
- a friction disc including a tab and an extension that are coupled to a distal portion of the friction disc, the tab positioned at a first radius of the friction disc and the extension positioned at a second radius of the friction disc different than the first radius, the tab extending an axial direction of the friction disc along the first radius, and the extension extending in the axial direction of the friction disc along the second radius, and
- a piston configured to urge the friction disc into engagement with a torque converter cover to transfer torque from the torque converter cover to the torsional vibration damper, wherein the tab is configured to engage a spring member or a spring seat of the torsional vibration damper,
wherein the extension is configured to slide against a guide surface of the plate to provide radial guidance to the friction disc, and
wherein the tab includes a segment configured to slide against the guide surface of the plate or a guide surface of a different plate to provide radial guidance to the friction disc.

9. The vehicle torque converter assembly of claim 8, wherein the plate includes a retainer plate partially defining an annular cavity in which the spring member is positioned.

10. The vehicle torque converter assembly of claim 9, wherein the guide surface is positioned radially outward relative to the extension and includes an inner circumferential surface of the retainer plate that extends alongside a terminal portion of the extension.

11. The vehicle torque converter assembly of claim 9, wherein the guide surface is positioned radially inward relative to the extension and includes an outer circumferential surface of the retainer plate that extends alongside a terminal portion of the extension.

12. The vehicle torque converter assembly of claim 8, wherein the tab is a first tab, and wherein the friction disc includes a second tab angularly spaced from the first tab, the extension extending substantially from the first tab to the second tab.

13. The vehicle torque converter assembly of claim 12, wherein each of the first tab and the second tab has an arc length that is less than an arc length of the extension.

14. The vehicle torque converter assembly of claim 12, wherein the first tab, the second tab, and opposite ends of the extension define cutouts extending through the friction disc.

15. The vehicle torque converter assembly of claim 8, wherein the extension includes an axial segment at the second radius and a radial segment connected between the axial segment and the distal portion of the friction disc, the axial segment extending axially away from the radial segment along an axis to define a centering surface.

* * * * *